(12) United States Patent
Zhu et al.

(10) Patent No.: US 10,066,538 B2
(45) Date of Patent: Sep. 4, 2018

(54) ELECTROMECHANICAL SPRING CLUTCH WITH INTEGRATED SPEED DETECTION

(71) Applicant: Litens Automotive Partnership, Woodbridge (CA)

(72) Inventors: Yongguang Zhu, Mississauga (CA); Zbyslaw Staniewicz, Mississauga (CA); Noel Abreu, Etobicoke (CA); Bashar Yazigi, Woodbridge (CA); Roman Tracz, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 169 days.

(21) Appl. No.: 15/100,339

(22) PCT Filed: Dec. 1, 2014

(86) PCT No.: PCT/CA2014/000865
§ 371 (c)(1),
(2) Date: May 30, 2016

(87) PCT Pub. No.: WO2015/077870
PCT Pub. Date: Jun. 4, 2015

(65) Prior Publication Data
US 2016/0298527 A1    Oct. 13, 2016

Related U.S. Application Data

(60) Provisional application No. 61/910,180, filed on Nov. 29, 2013, provisional application No. 61/910,250, (Continued)

(51) Int. Cl.
*F01P 7/16*    (2006.01)
*H02K 49/06*    (2006.01)
(Continued)

(52) U.S. Cl.
CPC .............. *F01P 7/16* (2013.01); *F01P 3/20* (2013.01); *F01P 5/12* (2013.01); *F01P 7/164* (2013.01);
(Continued)

(58) Field of Classification Search
CPC ........................................................ F01P 7/16
(Continued)

(56) References Cited

U.S. PATENT DOCUMENTS 4,874,072 A    10/1989  Mohan et al.
6,230,866 B1    5/2001  Link
(Continued)

FOREIGN PATENT DOCUMENTS

TK    2013049919 A1    4/2013
WO    2012045151 A1    4/2012
(Continued)

OTHER PUBLICATIONS

EESR for PCT/CA2014/000865 dated Jun. 2, 2017.
ISR and WO for WO2015077870 dated Mar. 12, 2015.

*Primary Examiner* — David S Luo
(74) *Attorney, Agent, or Firm* — Millman IP Inc.

(57) ABSTRACT

In an aspect, an electromechanical apparatus is provided, comprising an electromagnet, a magnetically permeable rotor, a drive, a current source, a current sensor and processing logic. The electromagnet includes a magnetically permeable housing and a wire coil disposed therein. The rotor spins and is disposed in the path of a magnetic circuit generated by the electromagnet. The drive rotates the rotor relative to the electromagnet housing. The rotor and electromagnet housing vary the reluctance therebetween as the rotor rotates. The current source applies a current to the electromagnet coil, wherein, during rotation of the rotor, fluctuations in the current result in the electromagnet coil due to the aforementioned varying reluctance are superim-
(Continued)

posed on the applied current. The current sensor senses fluctuations in current in the electromagnet coil. The processing logic reads the sensed current and determines the frequency of the fluctuations, which are correlated to rotor speed.

11 Claims, 19 Drawing Sheets

Related U.S. Application Data filed on Nov. 29, 2013, provisional application No. 61/911,331, filed on Dec. 3, 2013, provisional application No. 61/911,336, filed on Dec. 3, 2013, provisional application No. 61/946,893, filed on Mar. 3, 2014, provisional application No. 62/011,974, filed on Jun. 13, 2014.

(51) Int. Cl.

| | | |
|---|---|---|
| *G01P 3/488* | (2006.01) | |
| *H02K 11/225* | (2016.01) | |
| *F01P 3/20* | (2006.01) | |
| *F01P 5/12* | (2006.01) | |
| *F01P 11/16* | (2006.01) | |
| *F16D 13/08* | (2006.01) | |
| *F16D 27/02* | (2006.01) | |
| *F16D 48/06* | (2006.01) | |

(52) U.S. Cl.
CPC .............. *F01P 11/16* (2013.01); *F16D 13/08* (2013.01); *F16D 27/025* (2013.01); *F16D 48/064* (2013.01); *G01P 3/488* (2013.01); *H02K 11/225* (2016.01); *H02K 49/06* (2013.01); *F01P 2025/08* (2013.01); *F01P 2025/32* (2013.01); *F01P 2031/36* (2013.01); *F16D 2500/1045* (2013.01); *F16D 2500/10418* (2013.01); *F16D 2500/3064* (2013.01); *F16D 2500/5041* (2013.01)

(58) Field of Classification Search
USPC ........................................ 318/80, 68, 66, 34
See application file for complete search history.

(56) References Cited

U.S. PATENT DOCUMENTS

| | | |
|---|---|---|
| 7,095,198 B1 | 8/2006 | O'Brien |
| 7,176,644 B2 * | 2/2007 | Ueda ...................... H02P 6/182 |
| | | 318/400.14 |
| 8,224,517 B2 | 7/2012 | Eser et al. |
| 2013/0089436 A1 | 4/2013 | Bialas et al. |
| 2013/0156065 A1 | 6/2013 | Graf |
| 2013/0187638 A1 | 7/2013 | Herbst |
| 2016/0040733 A1 | 2/2016 | Staniewicz et al. |

FOREIGN PATENT DOCUMENTS

| | | |
|---|---|---|
| WO | 2012079155 A1 | 6/2012 |
| WO | 2012131663 A1 | 10/2012 |
| WO | 2013152430 A1 | 10/2013 |
| WO | 2013155615 A1 | 10/2013 |
| WO | 2014165977 A1 | 10/2014 |

\* cited by examiner

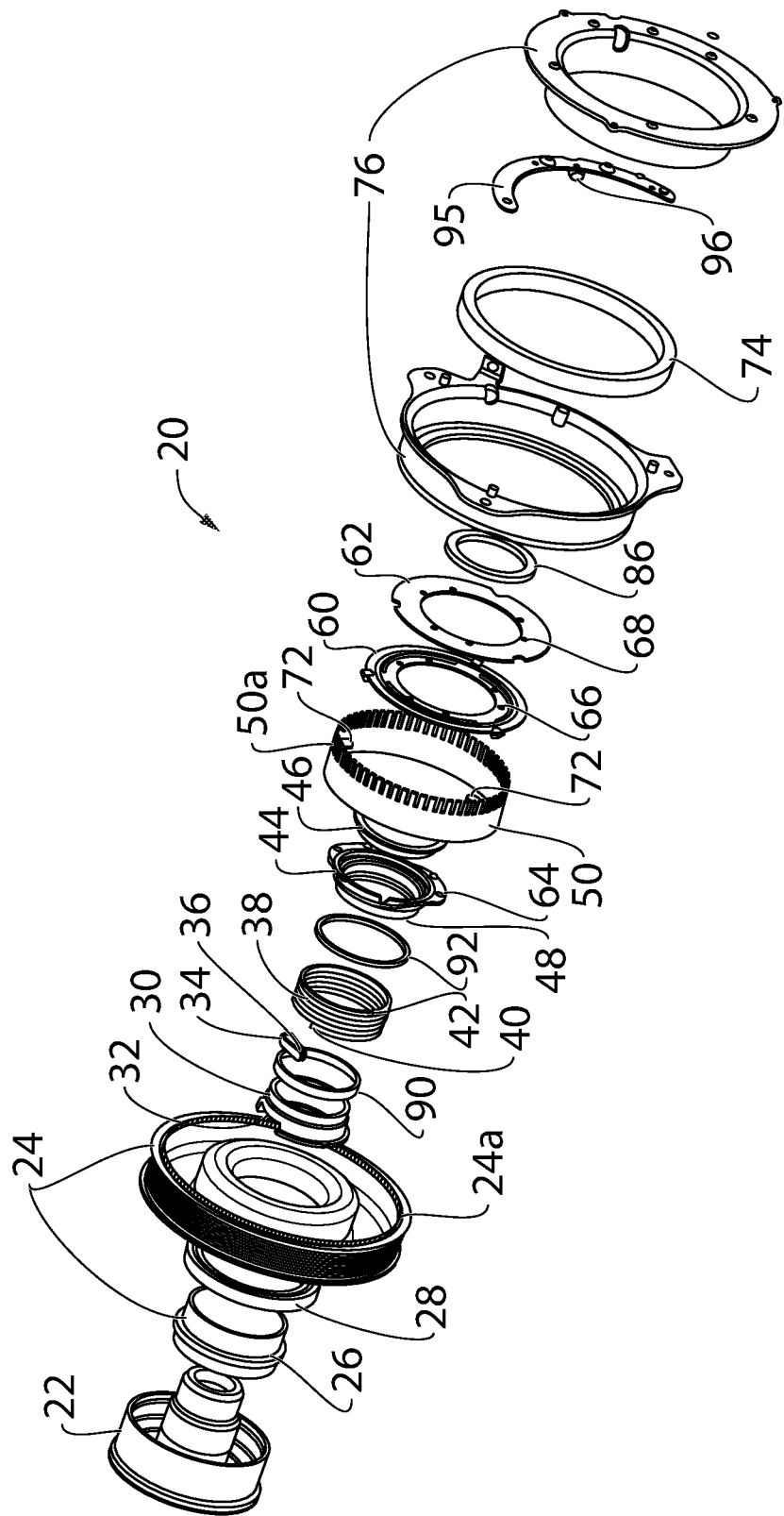

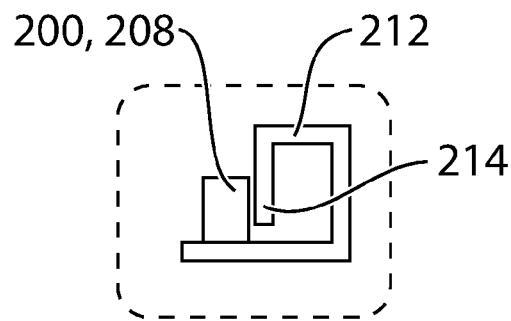
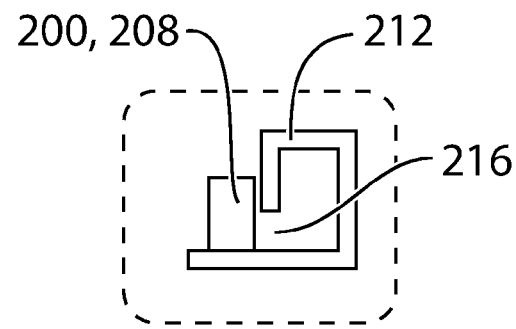
Fig.4A  Fig.4B
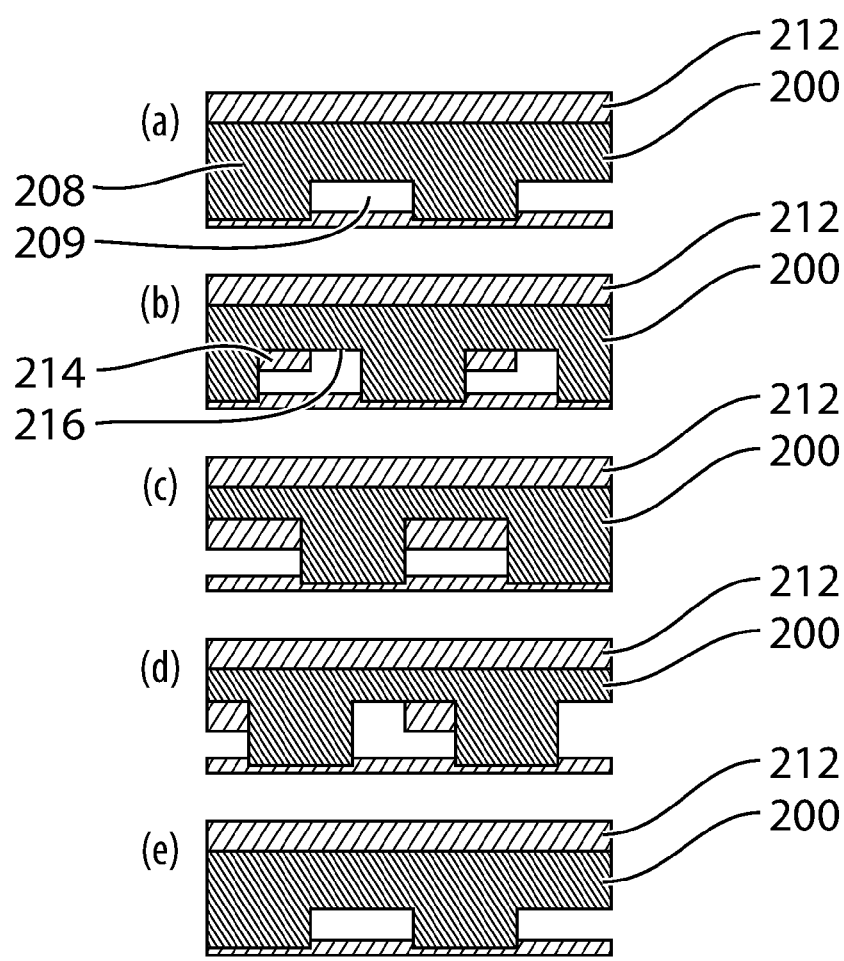
Fig.5

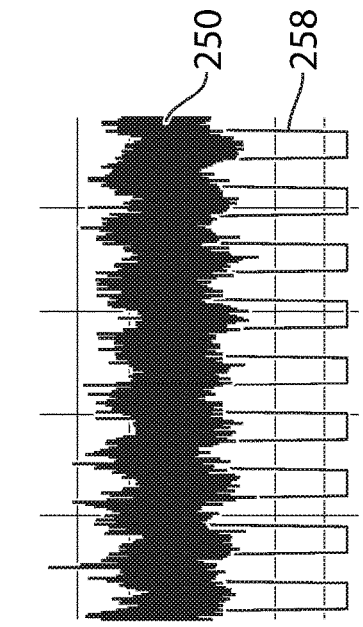
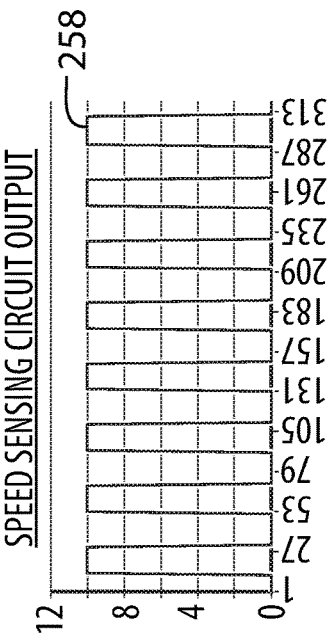
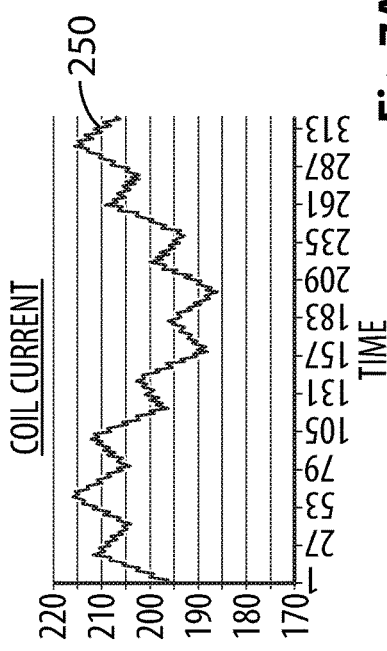
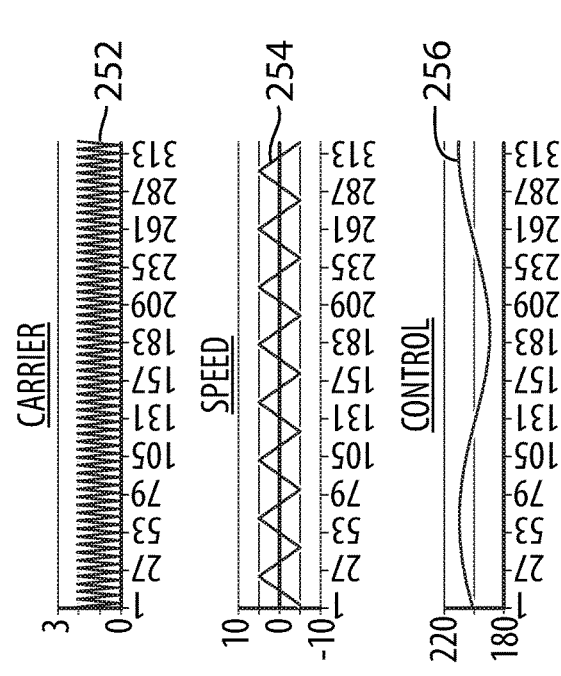

ELECTROMECHANICAL SPRING CLUTCH WITH INTEGRATED SPEED DETECTION

CROSS-REFERENCE TO RELATED APPLICATIONS

This application claims the benefit of U.S. Provisional Application No. 61/910,180, filed Nov. 29, 2013, U.S. Provisional Application No. 61/910,250 filed Nov. 29, 2013, U.S. Provisional Application No. 61/911,331 filed Dec. 3, 2013, U.S. Provisional Application No. 61/911,336, U.S. Provisional Application No. 61/946,893 filed Mar. 3, 2014, and U.S. Provisional Application No. 62/011,974, filed Jun. 13, 2014, the contents of all of which are incorporated herein by reference in their entirety.

FIELD OF DISCLOSURE

This disclosure relates generally to electromechanical apparatuses and more particularly to water pumps that are clutched and which are used to circulate coolant through an engine.

BACKGROUND

Some vehicles have water pumps that are belt driven but are clutched so as to permit the impeller of the water pump to be turned on and turned off. In some more advanced proposed united, the clutch may be cycled on and off repeatedly according to an adjustable duty cycle, permitting the water pump to achieve a range of selected flow rates for the coolant in the vehicle's coolant system. While such proposed units are advantageous it would be beneficial to be able to determine if there is a breakdown in the water pump that causes is to be non-operational (e.g. not pumping at all), or that causes it to be stuck at full flow. Furthermore, it would be beneficial to be able to determine the speed of the water pump when it is operating. Preferably one or more of these features can be provided at relatively low cost.

SUMMARY

In a first aspect, an electromechanical apparatus is provided, and includes an electromechanical apparatus is provided, comprising an electromagnet, a magnetically permeable rotor, a drive, a current source, a current sensor and processing logic. The electromagnet includes a magnetically permeable housing and a wire coil disposed therein. The magnetically permeable rotor spins about an axis within the apparatus, the rotor being disposed in the path of a magnetic circuit generated by the electromagnet when energized. The drive is for rotating the rotor relative to the electromagnet housing. The rotor and the electromagnet housing are each shaped to vary the reluctance between the rotor and the electromagnet housing as the rotor rotates. The current source is configured to apply a current to the electromagnet coil, wherein, during rotation of the rotor, fluctuations in the current result in the electromagnet coil due to varying reluctance between the rotor and the electromagnet housing are superimposed on the applied current. The current sensor is connected to, and senses the fluctuations in the current in, the electromagnet coil. The processing logic is connected to the current sensor and is configured for reading the sensed current and determining the frequency of the fluctuations, said frequency being correlated to the rotor speed.

In another aspect, a method is provided for detecting the speed of a magnetically permeable rotor, comprising:

provisioning an electromagnet, including a magnetically permeable housing and a wire coil disposed therein, such that the rotor is disposed in the path of a magnetic circuit generated by the electromagnet when energized;

shaping each of the rotor and the electromagnet so as to vary the reluctance between the rotor and the electromagnet housing as the rotor rotates;

applying a current to the electromagnet coil, whereby a fluctuating speed sensing current is induced on the electromagnet coil and superimposed on the applied current as the rotor spins;

sensing the current in the electromagnet coil; and processing the sensed current to determine the frequency of the fluctuations in the speed sensing current, whereby the rotor speed is correlated to the frequency.

In yet another aspect, a cooling system for an engine for a vehicle is provided, and includes a water pump configured to circulate coolant through the engine, a temperature sensor and a control system. The water pump is selectably clutched so as to permit the water pump to be turned on and off. The temperature sensor is positioned to sense the temperature of the coolant. The control system is configured to control clutching of the water pump and to receive signals from the temperature sensor. The control system is programmed with a first scheme for detecting whether the water pump is operating properly, wherein the first scheme is carried out by the control system if a first set of criteria are met during operation of the vehicle. The control system is programmed with a second scheme for detecting whether the water pump is operating properly, wherein the second scheme is carried out by the control system if a second set of criteria are met during operation of the vehicle. The second set of criteria are different than the first set of criteria.

In yet another aspect, a method is provided for determining the health of a water pump in a coolant system for an engine of a vehicle, comprising:

a) operating the water pump upon startup of the engine;

b) commanding the water pump to stop;

c) determining a first coolant temperature a first selected period of time after step b);

d) determining a second coolant temperature a second selected period of time after step b);

e) determining whether a difference between the first and second coolant temperatures is greater than a predetermined threshold flat-line value; and f) outputting a notification if the difference in step e) is greater than the selected threshold flat-line value.

In yet another aspect, a method is provided for determining the health of a water pump in a coolant system for an engine of a vehicle, comprising:

a) operating the water pump for at least a selected low duty cycle threshold period of time at a duty cycle that is below a selected threshold low duty cycle value;

b) commanding an increase in the duty cycle of the water pump that is greater than a selected threshold duty cycle change value;

c) determining a peak coolant temperature during a first selected period of time after step b);

d) determining a minimum coolant temperature a during second selected period of time after the first selected period of time;

e) determining whether a difference between the peak and minimum coolant temperatures is greater than a predetermined threshold temperature change value;

f) determining the health of the water pump based at least in part on the result of step e); and g) outputting a notification based on step f).

BRIEF DESCRIPTION OF THE DRAWINGS

The foregoing and other aspects of the disclosure will be more readily appreciated by reference to the accompanying drawings, wherein:

FIGS. 1A and 1B are exploded perspective views of a clutch assembly for use in a device on a vehicle engine;

FIGS. 4A and 4B are sectional views of an armature and an electromagnet housing that houses an electromagnet coil, which are part of the electromechanical apparatus shown in FIGS. 3A and 3B;

FIGS. 5(a)-5(e) are sectional views of the armature and electromagnet housing at different relative positions;

FIGS. 7A-7C are graphs illustrating the current in the electromagnet coil;

FIG. 7D is a graph illustrating an output from a speed measurement circuit for determining the speed of the electromechanical apparatus;

FIG. 11 and FIGS. 11A-11E illustrate a circuit configured to be used to carry out the control scheme illustrated in FIG. 9;

FIG. 16 is a graph illustrating the coolant temperature and duty cycle for a water pump that is stuck on;

DETAILED DESCRIPTION

Figure 1B:
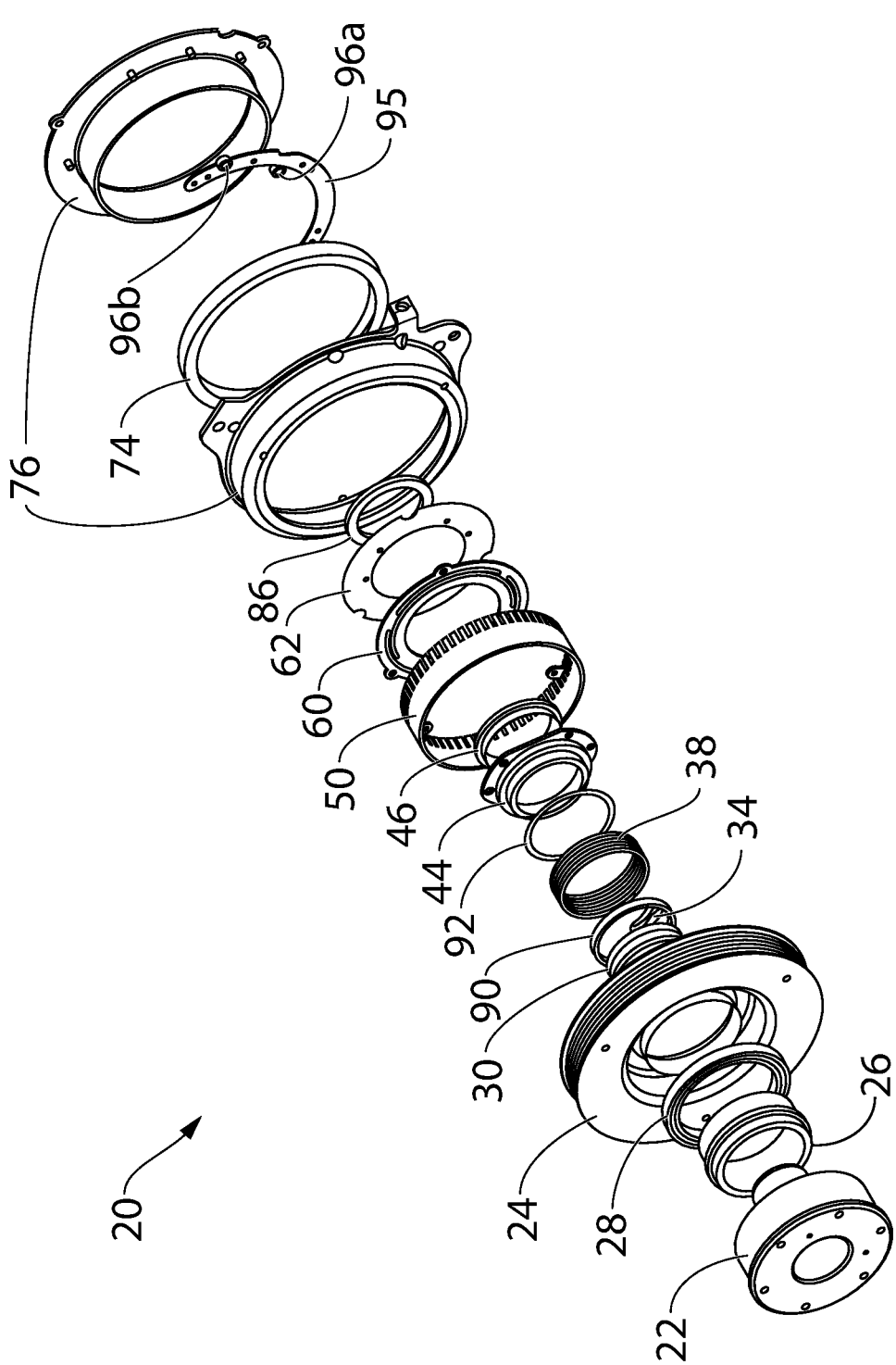
Figure 1C:
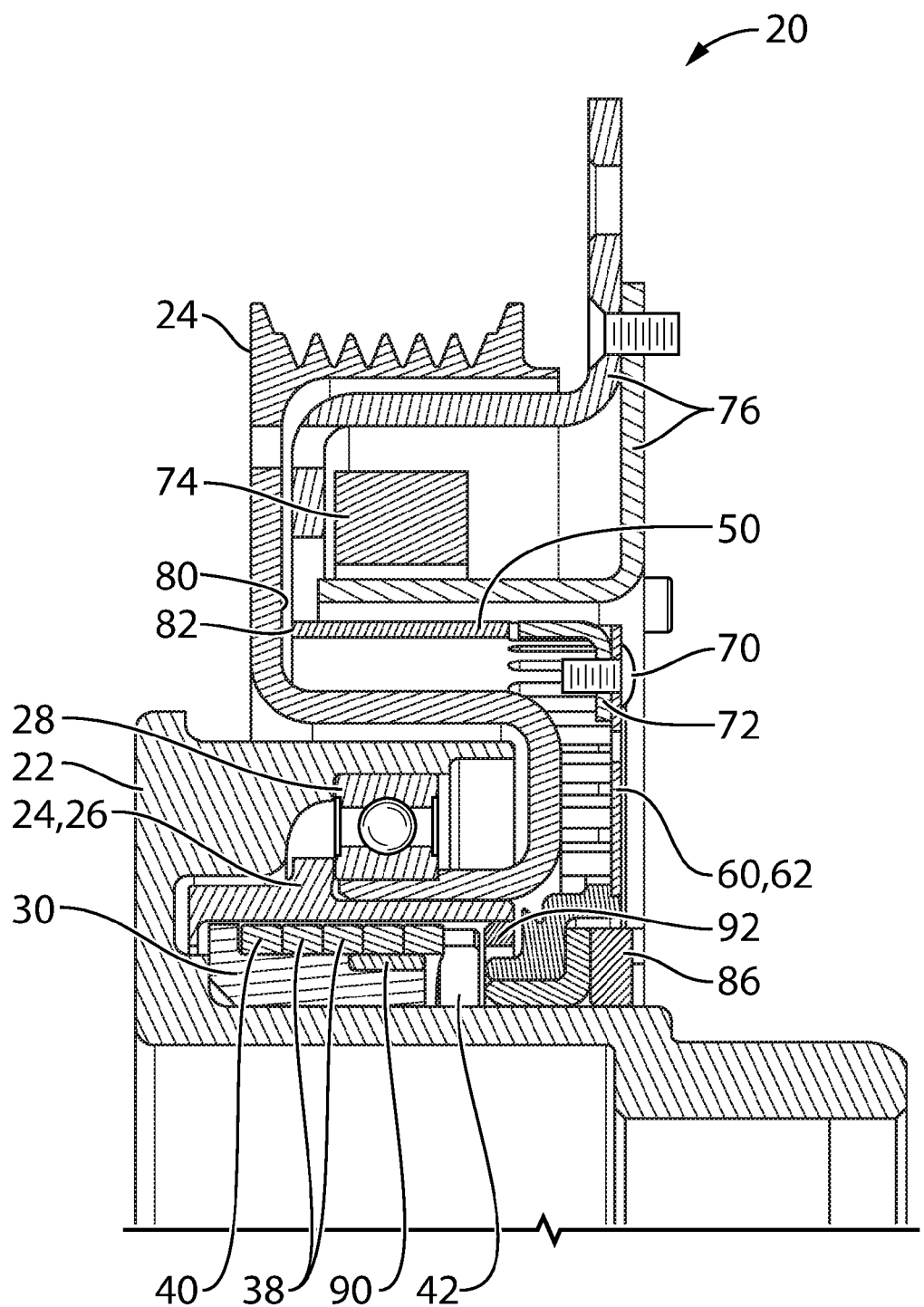
FIG. 1C is a magnified sectional elevation view of a portion of the clutched device shown in FIGS. 1A and 1B.

FIGS. 1A and 1B are exploded views of a portion of a clutch assembly 20. FIG. 1C is a cross-sectional view of the clutch assembly 20. The clutch assembly 20 selectively permits the transfer of torque between a first clutch member, such as (but not limited to) a crankshaft adapter 22 that mounts to an engine crankshaft, and a second clutch member, such as (but not limited to) a pulley 24 deployed in an accessory drive system. In this assembly the first clutch member or crankshaft adapter 22 provides the rotational input and the second clutch member or pulley 24 provides the rotational output such that the clutch assembly 20 selectively permits power to flow from the crankshaft adapter 22 to the pulley 24. This clutch assembly 20 is also normally disengaged, i.e., it must be actuated to permit power to flow to the output.

Referring to FIGS. 1A-1C, the pulley 24 includes a sleeve 26 which is supported on the crankshaft adapter 22 by a bearing 28. A retainer 30 is rotationally connected to the crankshaft adapter 22. The retainer 30 has an aperture 32 (seen best in FIG. 1A) which holds a wrap spring carrier 34. The carrier 34 has a slot 36 which holds a first end 40 of a wrap spring clutch 38. An actuator 44 is journalled about the crankshaft adapter 22 via a bushing 46. The actuator 44 has a slot 48 which holds a second end 42 of the wrap spring clutch 38.

The actuator 44 is rotationally connected to an armature 50 such that the two components rotate together yet have some axial play therebetween. In the illustrated embodiment the axial play is provided by a leaf spring 60 that interconnects the actuator 44 and armature 50 and biases the armature 50 away from the pulley 24. More particularly, (as seen best in FIG. 1A) the actuator 44 is connected to a rigid backing plate 62 via rivets 64 that pass through apertures 66 and 68 in the leaf spring 60 and backing plate 62, respectively. The armature 50 is connected to the leaf spring 60 via a plurality of shank rivets 70 (seen in FIG. 1C) that pass through tabs 72 (seen best in FIGS. 1A and 1C) on the armature 50. In other embodiments, the leaf spring 60 and backing plate 60 can be omitted and the actuator 44 and armature 50 can be meshingly interconnected via circumferentially disposed teeth on each of the components such as shown in PCT publication WO2013049919A1, the contents of which are incorporated herein in their entirety.

The clutch assembly 20 also includes an electromagnet, comprising wire coil 74 and a magnetically permeable housing 76.

When energized the electromagnet generates a magnetic flux that flows through the housing 76, the pulley 24 and the armature 50. The magnetic flux draws the armature 50 axially, overcoming the bias of the leaf spring 66, so that the armature 50 frictionally engages the pulley 24 at engagement surfaces 80, 82 (referenced in FIG. 1C).

The crankshaft adapter 22, which provides the rotational input, carries the retainer 30 and the carrier 34 so that these components (22, 30, 34) rotate at the same speed. The wrap spring clutch 38 is connected between the carrier 34 and the actuator 44, as discussed above. The wrap spring clutch 38 has a nominal diameter smaller than the inner diameter of the pulley sleeve 26. The actuator 44 is rotationally connected to the armature 50, as discussed above. When the electromagnet is de-energized, the armature 50 free-wheels. In this state the second end 42 of the wrap spring clutch 38 is connected to a relatively small inertial mass which is insufficient to cause the wrap spring clutch 38 to expand radially to engage the pulley sleeve 26. Consequently, while the wrap spring clutch 38, actuator 44 and armature 50 all rotate with the crankshaft adapter 22, the retainer 32 and the carrier 34, the wrap spring clutch 38 does not transfer torque to the pulley 24.

However, when the electromagnet is energized the magnetic flux draws the armature 50 axially to frictionally engage the pulley 24 via engagement surfaces 80, 82, thus connecting the second end 42 of the wrap spring clutch 38 to a relatively large inertial mass. This causes a lag in the phase angle between the armature 50 and the crankshaft adapter 22 and causes the wrap spring clutch 38 expands radially to transfer torque to the pulley 24.

The clutch assembly 20 can include a variety of additional components such as actuator retainer 86 which can be pressed on the crankshaft adapter 22 to prevent the actuator 44 from withdrawing axially away from the pulley 24. A slip ring 90 can be provided to aid in contraction of the wrap spring clutch 38 as discussed in WO2013049919A1. The pulley sleeve 26 can have a separate lip member 92 that functions as a grease dam.

A control system controls the current to the electromagnet and the magnetomotive force it produces. In the illustrated embodiment the control system includes a printed circuit board (PCB) 95 which utilizes a speed sensor for control and/or diagnostic purposes. More particularly, two Hall effect sensors 96 (one sensor 96a and one sensor 96b, seen best in FIG. 1B) are mounted on the PCB 95 to detect the passage of teeth 50a formed in the armature 50 and teeth 24a formed in the pulley 24.

The control system can be implemented in a variety of ways. In one implementation the control system can control the clutch assembly 20 in an on/off manner such that the wrap spring clutch 38 is either collapsed, in which case no torque is transferred to the pulley 24, or fully expanded, in which case the full torque from the crankshaft adapter 22 is transferred to the pulley 24. In another implementation the control system can, by varying the amount of current to the electromagnet, adjust the phase angle between the first and second ends 40, 42 of the wrap spring clutch 38 and thus control the amount of torque transferred to the pulley 24 and consequently the speed of the pulley 24. Examples of such control systems are described and discussed in PCT publication no. WO2013152430, the contents of which are incorporated herein in their entirety.

Figure 2:
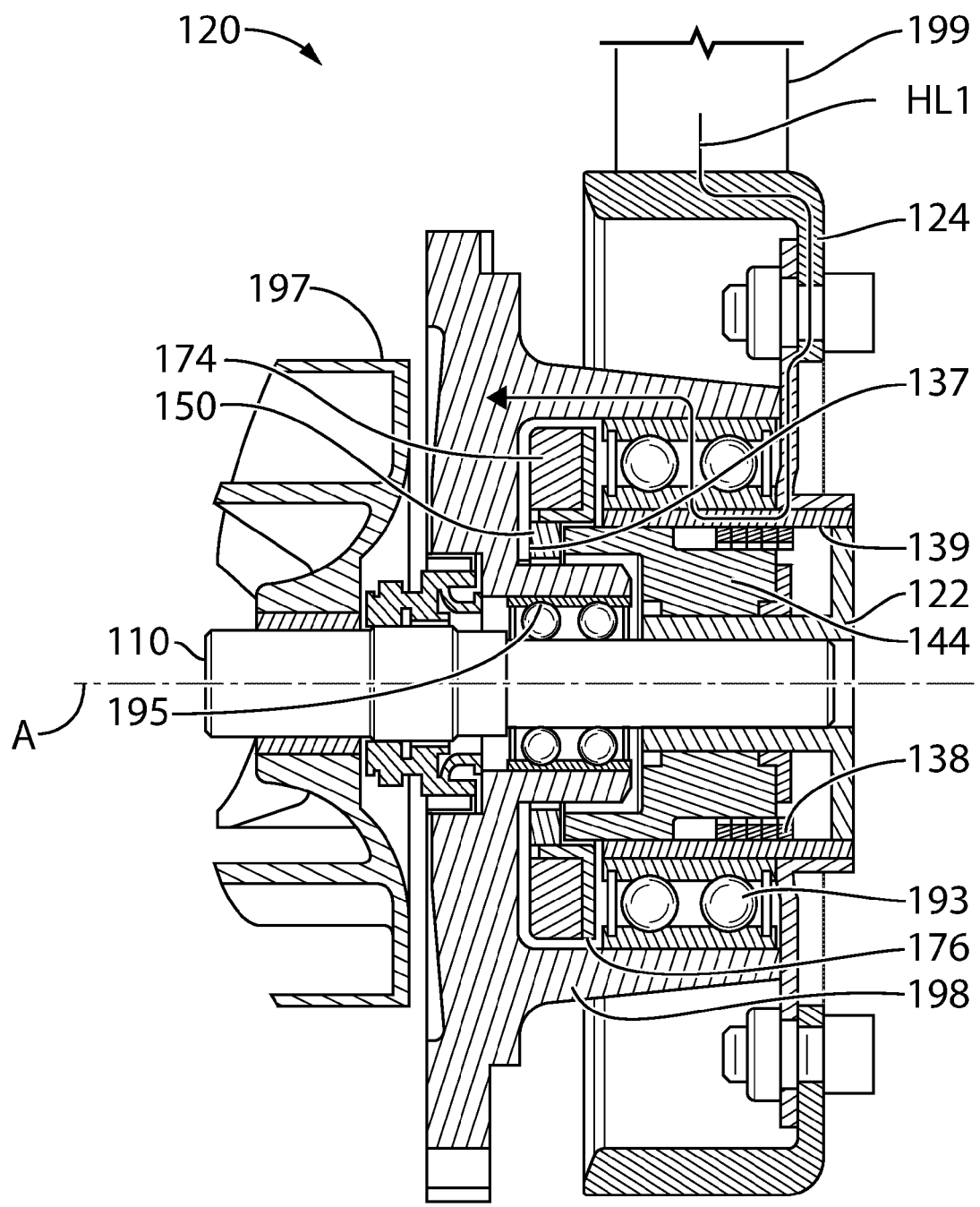
FIG. 2 is a sectional elevation view of a clutched device in accordance with an embodiment of the present invention.

FIG. 2 shows another embodiment of a clutch assembly 120, which is discussed in WO2013152430A1 and WO2013049919A1. The clutch assembly 120 includes a first clutch member provided by a pulley 124 that is engaged with a belt 199 and a second clutch member provided by a shaft adaptor 122 configured for mounting to the shaft 110 of a driven vehicular accessory such as a water pump impeller 197. In this assembly 120 the pulley 124 provides the rotational input and the shaft adaptor 122 provides the rotational output such that the clutch assembly 120 selectively permits power to flow from the pulley 124 to the shaft adaptor 122. This clutch assembly 120 is normally engaged, i.e., it must be actuated to stop power flowing to the output.

The clutch assembly 120 includes a wrap spring clutch 138, an armature 150, an actuator 144 and an electromagnet that includes a wire coil 174 and a housing 176. The electromagnet is mounted to a stationary member 198 which may be a bracket that is integral with the housing for the accessory. A bearing is shown at 195 between the shaft 110 and the stationary member 198 to support the shaft 110 for rotation thereon. Another bearing is shown at 193 between the pulley 124 and the stationary member 198 to support the pulley 124 for rotation thereon.

The wrap spring clutch 138 is similar to the wrap spring clutch 38 except that the nominal diameter of the wrap spring clutch 138 is sufficiently large to bring its coils into engagement with an inner surface 139 of the shaft adaptor 122 so that the clutch assembly is normally engaged. The electromagnet generates a magnetic flux which passes through the armature 150 and draws it into engagement with a stationary friction surface 137, which functions as a relatively large inertial mass. This engagement, in turn, shifts the angular position of the second end of the wrap spring clutch 138 relative to its first end, causing the wrap spring clutch 138 to contract radially away from the inner surface 139. By applying sufficient current to the electromagnet coil 174 the wrap spring clutch 138 can be contracted completely out of engagement with the clutch surface 139 so that no torque is transferred to the shaft adapter 122. By applying some lesser amount of current to the electromagnet coil 174, the wrap spring clutch 138 can transmit some torque to the shaft adapter 122 and thus vary the output speed of the shaft 110 relative to that of the pulley 124.

As discussed above, a control system can be implemented to control the clutch assembly 120 in either an on/off manner or a variable speed manner.

Sensor-Less Speed Measurement

In each of the foregoing assemblies 20, 120 the output second clutch member rotates at the same speed as the armature and thus the armature speed can provide useful control and/or diagnostic information. For variable speed control, the armature speed can provide a feedback signal to the controller. For on/off control, the armature speed can provide diagnostic information, e.g., confirming that the device is working. The armature speed can be measured by a conventional speed sensor such as the Hall effect sensors 96 of clutch assembly 20 which are used to sense the passage of armature teeth 50a. However, such an additional sensor adds cost and presents another mode of failure. The discussion that follows presents another technique for sensing the armature speed using the principles of electromagnetic induction, which eliminates the need for an additional sensor.

Figure 3A:
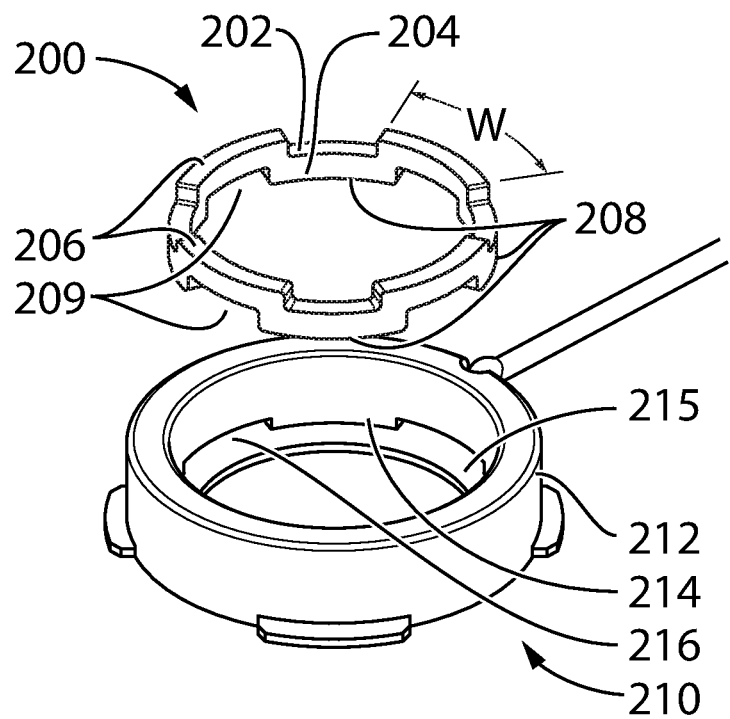
FIGS. 3A and 3B are perspective views of an electromechanical apparatus that is usable with the clutch assemblies shown in FIGS. 1A, 1B and 2.
Figure 3B:
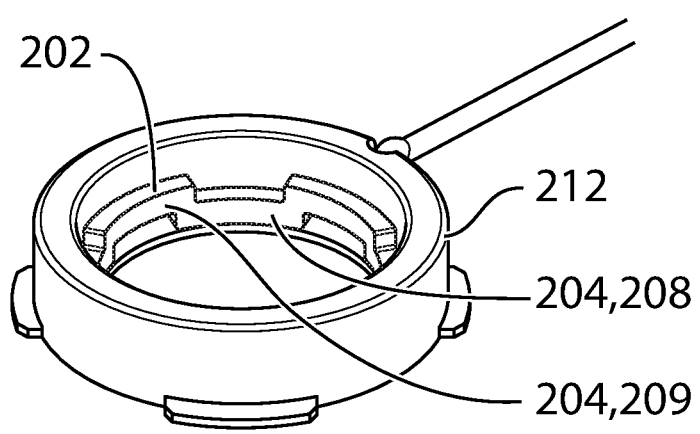

FIGS. 3A and 3B show another embodiment of an armature 200 and an electromagnet 210 which can be used in clutch assemblies 20, 120. The electromagnet 210 includes a housing 212 which houses a wire coil 215. The armature 200 has a circumferential wall with an actuator engagement side 202 and a speed sensing side 204. The actuator engagement side 202 has a plurality of teeth 206 for rotationally connecting the armature 200 to meshing teeth formed in the actuator (not shown). The actuator engagement side 202 could embody other means for interconnecting the armature 200 to the actuator, such as the leaf spring interconnect shown in FIGS. 1A-1C in which case the actuator engagement side could be smooth or toothless.

The speed sensing side 204 of the armature 200 has a plurality of axially extending teeth 208 and corresponding cutouts 209 formed therein. Likewise, the electromagnet housing 212 has an inner circumferential wall with a plurality of axially extending teeth 214 and corresponding cutouts 216 formed therein. In the illustrated embodiment the width W of each of the armature and housing teeth and cutouts 208, 214 is substantially the same but may differ in other embodiments. The armature teeth 208 and the housing teeth 214 are juxtaposed circumferentially so as to provide a mechanism for varying the magnetic reluctance of the armature 200 as it rotates relative to the housing 210.

The phenomenon is explained in greater detail with reference to the schematic diagrams of FIGS. 4A and 4B (in cross-sectional view) and FIG. 5 (in plan view). As the armature 200 rotates relative to the housing 210 the total cross-sectional area between the coil 215 and the armature 200, which represents the effective area of the magnetic path, cyclically increases and decreases as the armature teeth 208 and housing teeth 214 cyclically face and pass one another. More particularly, the effective area reaches its maximum value when the armature and housing teeth 208, 214 (as well as armature and housing cutouts 209, 216) directly face one another or are in registration as seen in FIG. 4A and FIG. 5(a). As the armature 200 continues to rotate (to the left in FIG. 5) the position of the armature teeth 208 shift relative to the housing teeth 214, reducing the effective area as seen in FIG. 5(b). The effective area reaches its minimum value when the armature teeth 208 directly face or oppose the housing cutouts 216, as seen in FIG. 4B and FIG. 5(c). The value of the effective area changes it direction and starts to increase again as the armature 200 continues to rotate, as seen in FIG. 5(d), and reaches its starting position where the effective area is again at its maximum value as seen in FIG. 4A and FIG. 5(e) (which is the same as FIG. 5(a)).

This cyclical increase and decrease in the effective area of the magnetic path causes the magnetic reluctance and flux to cyclically increase and decrease so as to induce a cyclically varying voltage on the electromagnet, which can be sensed as a fluctuating coil current. This can be understood from Faraday's law which states: V=f(dΦ/dt), where V is the induced voltage and Φ is the magnetic flux. The magnetic flux and reluctance are linked as follows: $\Phi=R_L/F_m$, and $F_m=H*l_e$, where $R_L$ is the magnetic reluctance, $F_m$ is the magnetomotive force, H is the magnetic field strength and $l_e$ is the effective magnetic length path. Changing the air gap or changing the effective cross-sectional area of the magnetic path changes the magnetic reluctance, that is, $R_L=f(l_g/A_e)$, where $l_g$ is the length of the air gap and $A_e$ is the effective cross-sectional area of the magnetic path. Thus, changing the effective area of the magnetic path generates an induced voltage at the coil and a fluctuating coil current, which may be alternatively referred to hereinafter as a "speed sensing current".

By capturing the speed sensing current and measuring its frequency the speed of the armature 200, and hence the second clutch member, can be measured. In the illustrated embodiment the speed will be proportional to the number of armature teeth 208 measured in a given time period.

Figure 6:
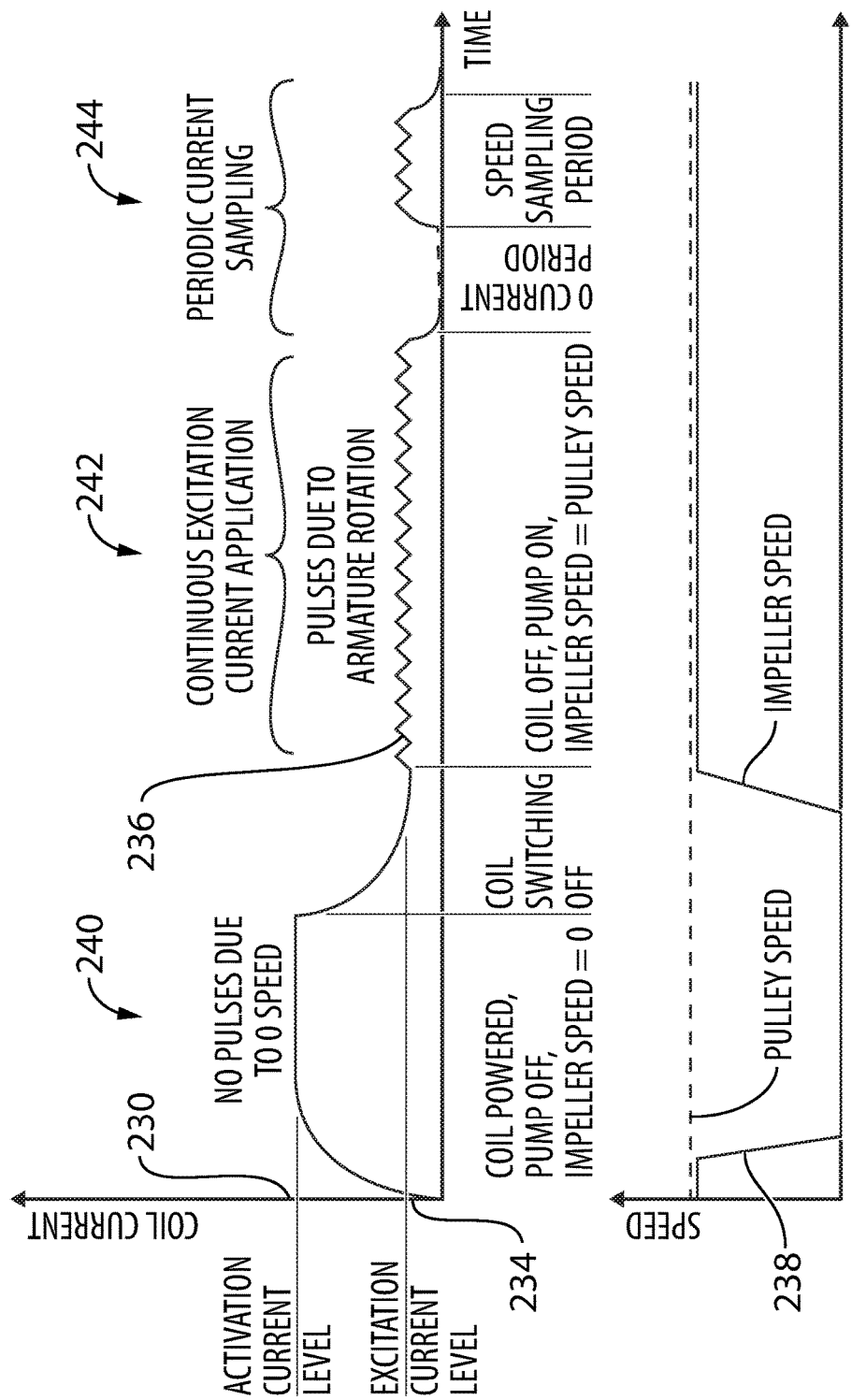
FIG. 6 is a graph illustrating current in the electromagnet coil and the speed of selected clutched components over a period of time.

The upper graph of FIG. 6 shows an example of a coil current in an on/off controlled, normally engaged clutch assembly such as assembly 120. The lower graph of FIG. 6 illustrates the corresponding speed 238 of the output second clutch member (e.g., impeller). In this application the control system generates two current levels: an activation current level 230, which is sufficient to fully collapse the wrap spring clutch and inhibit torque transfer to the second clutch member, and an excitation current level 234, which has no discernible effect on collapsing the wrap spring clutch but generates sufficient flux to induce and measure the fluctuating speed sensing current caused by the varying reluctance of the armature 200. In certain embodiments where the clutch assembly is used in a water pump in a 12V automotive system the excitation current 234 may be in the range of 70 to 120 mA but the level will differ depending on the particular application.

The activation current 230 may be applied and adjusted to control the amount of torque transfer to the second clutch member and therefore to control the speed of the second clutch member. Any suitable control scheme may be used to controlling the speed of the second clutch member. For example, a control scheme as described in pages 32-41 and shown in FIGS. 12a-14b of PCT patent publication WO2014165977A1, the contents of which are incorporated herein by reference in their entirety.

When the activation current 230 is applied to the coil 215, which is shown at time period T240, the armature and second clutch member are stopped and the speed sensing current is not active. When the excitation current 234 is applied to the coil, which is shown at time period T242, the speed 238 of the armature 200 and second clutch member rise to the speed of the input first clutch member (pulley) and the fluctuating speed sensing current 236 is active. It may not be necessary to continuously apply the excitation current for diagnostic purposes and time period T244 shows the state of the speed sensing current 236 as the excitation current 234 is periodically applied to the coil.

FIGS. 7A-7D shows an example of a coil current 250 in a variable speed, normally engaged clutch assembly such as assembly 20. As seen in FIG. 7A the coil current 250 can be decomposed into three components: a carrier current 252, representing a pulse width modulation signal that fluctuates at the switching frequency; a control current 256 for controlling the speed of the output second clutch member; and a speed sensing current 254 caused by the varying reluctance of the armature 200. FIG. 7C shows an oscilloscope trace of the coil current 250 (in a narrow time window relative to FIG. 7A), and FIG. 7D shows a digital speed signal 258 derived from processing the speed sensing current 254, as next discussed.

Figure 8:
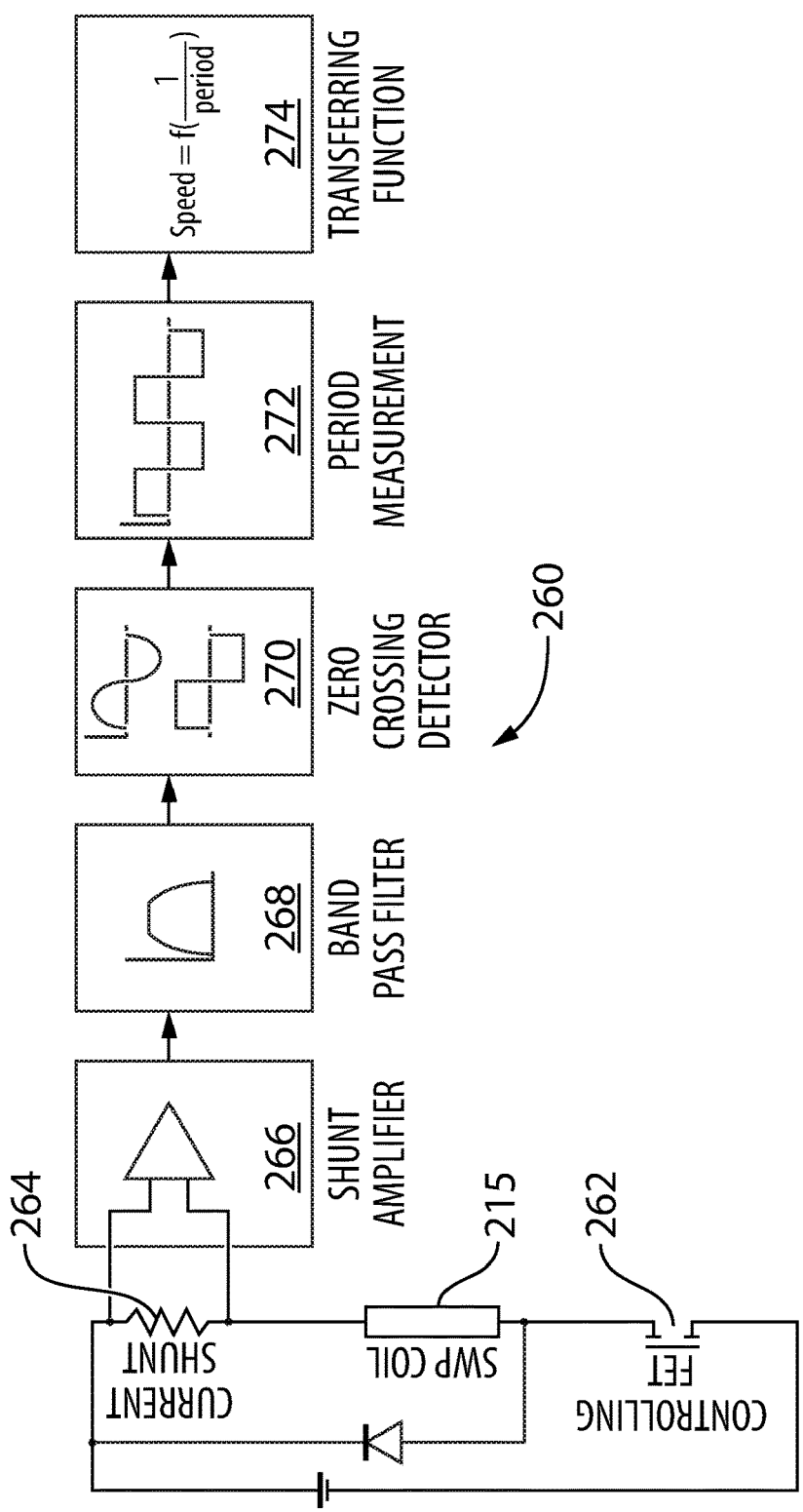
FIG. 8 is a block diagram illustrating a control scheme that is usable to carry out speed measurement on an armature of the electromechanical apparatus.

FIG. 8 shows one embodiment of processing logic 260 for deriving the digital speed signal 258 and determining the armature speed. In an on/off controlled, normally engaged clutch assembly the control system can include a controlling switch such as a FET 262 to apply the activation current 230 to the coil 215 using pulse width modulation (PWM) techniques. The same switch an also be used to apply the low level excitation current 234 using a low duty cycle PWM drive. The coil 215 is connected in series to a suitably sized resistor 264 which functions as a current shunt or any other suitable current measurement sensor. An amplifier 266 amplifies the sensed current which is then filtered by a bandpass filter 268 to remove high and low frequency components. A zero crossing detector 270 converts the filtered sinusoidal signal to the digital speed signal 258. From this, the period of the digital speed signal 258 can be easily measured and the armature speed calculated at logic blocks 272, 274. The armature speed is calculable in revolutions per minute (rpm) as 60/(period*number of teeth).

In embodiments where high frequency signals or noise is unlikely to be present the bandpass filter may be omitted and an alternative means for removing d.c. signal from the sensed current may be provided, such as an a.c. coupling. The amplifier may also be omitted depending on the particular application.

Figure 10:
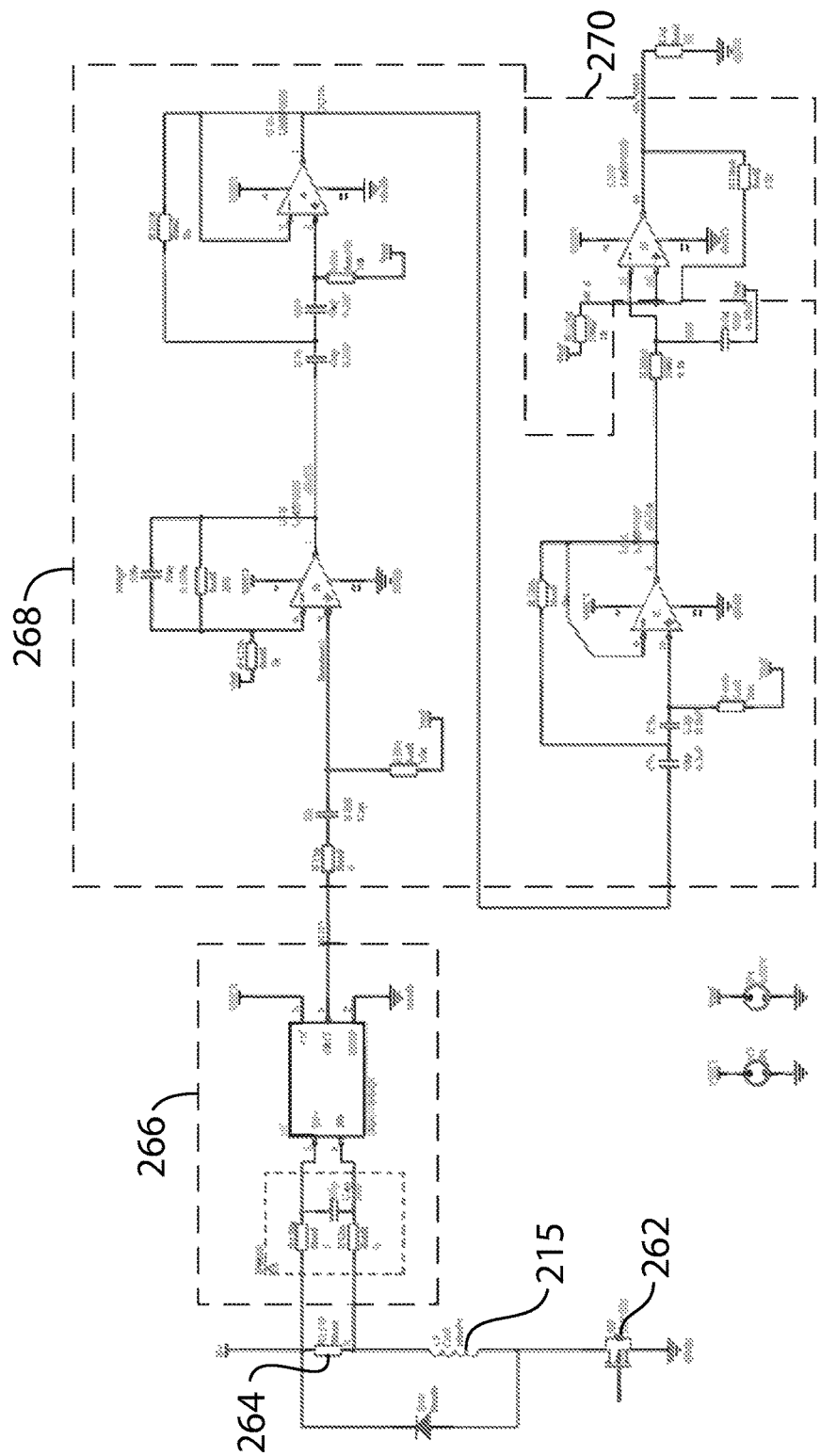
FIG. 10 illustrate a circuit configured to be used to carry out the control scheme illustrated in FIG. 8.

The processing logic 260 can be implemented in hardware as shown in FIG. 10 or in software using a digital signal processor (DSP), in which an analog to digital converter (ADC) (not shown) can be employed to process the amplified current to a logic signal for use by the DSP.

Figure 9:
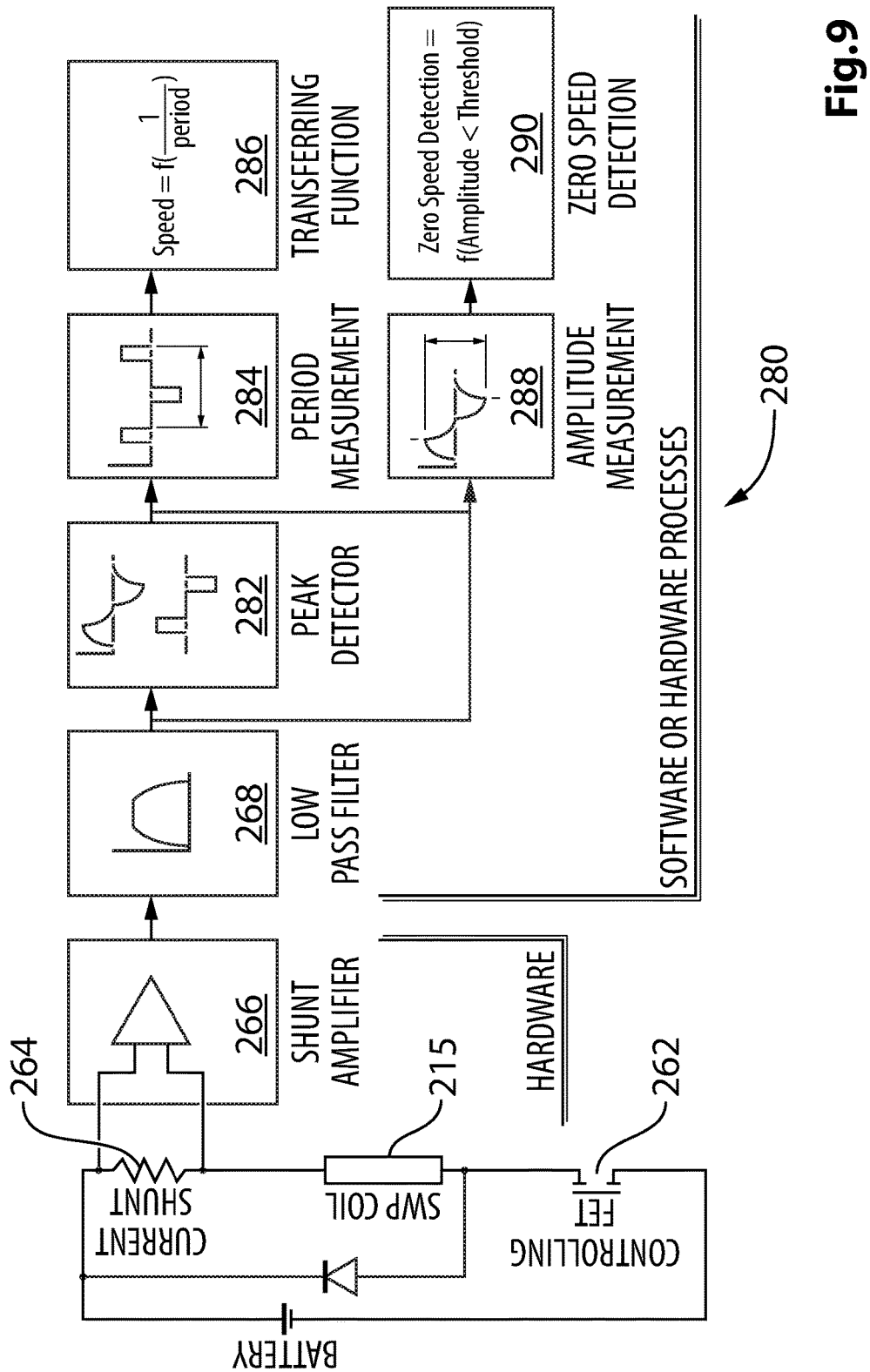
FIG. 9 is a block diagram illustrating an alternative control scheme that is usable to carry out speed measurement on an armature of the electromechanical apparatus.

FIG. 9 shows another embodiment of processing logic 280 for deriving the digital speed signal 258 and determining the armature speed. In this embodiment the amplified sensed current is also filtered by a bandpass filter 268 to remove high and low frequency components. A peak detector 282 converts the filtered sinusoidal signal to a peak timing signal. From this, the frequency or period of peak timings can be measured and the armature speed calculated at blocks 284, 286. This embodiment also includes a parallel noise filtering branch which measures the amplitude of the filtered signal at block 288 and determines zero speed or stoppage at block 280 if the amplitude of the amplified signal is less than a predetermined threshold value.

In embodiments where high frequency signals or noise is unlikely to be present the bandpass filter may be omitted and an alternative means for removing d.c. signal from the sensed current may be provided, such as an a.c. coupling. The amplifier may also be omitted depending on the particular application.

Figure 11:
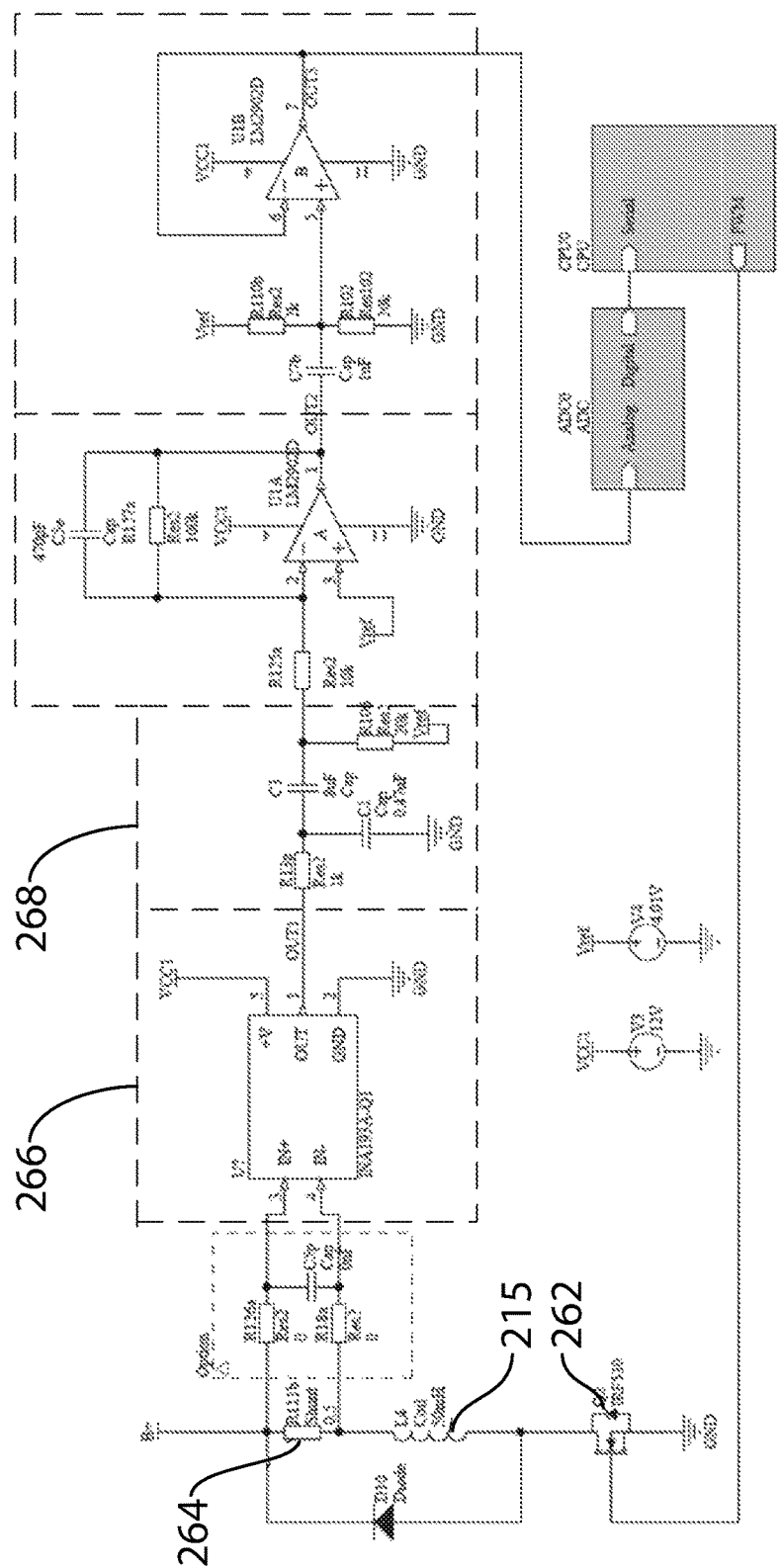

The processing logic 280 can be implemented in hardware as shown in FIG. 11 or in software using a DSP, in which case an ADC (not shown) can be employed to process the amplified current to a digital signal for use by the DSP.

Figure 12A:
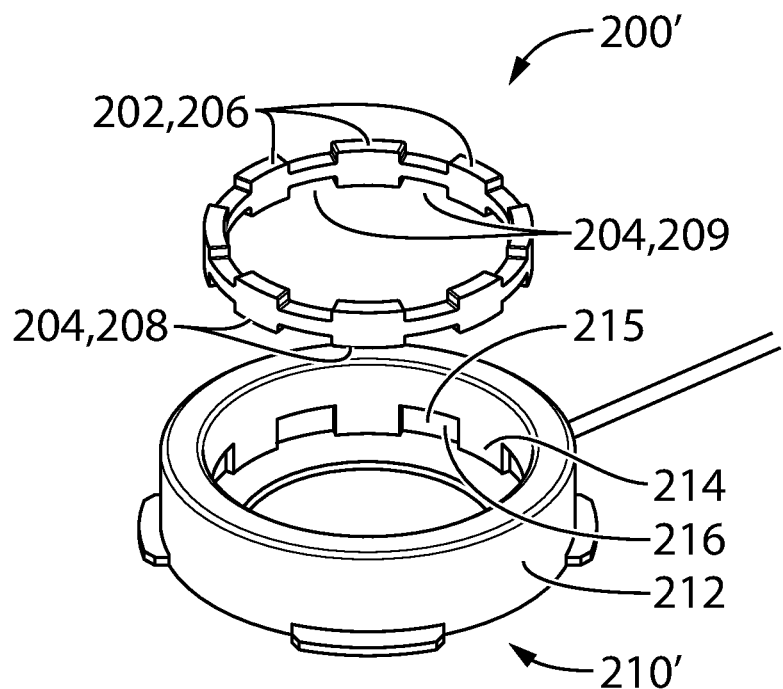
FIGS. 12A and 12B are exploded and non-exploded perspective views of another embodiment of an electromechanical apparatus.
Figure 12B:
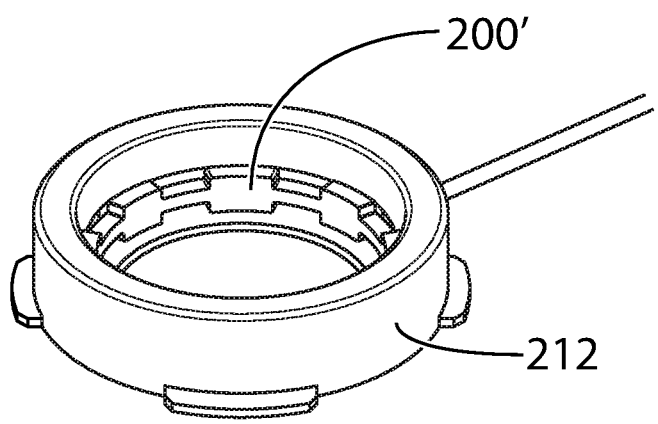

FIGS. 12A and 12B show an alternative embodiment of an armature 200' and electromagnet 210' which can be used in clutch assemblies 20, 120. This embodiment has double the number of armature teeth 208 and housing teeth 214 as compared to the embodiment shown in FIGS. 3A and 3B.

Figure 13A:
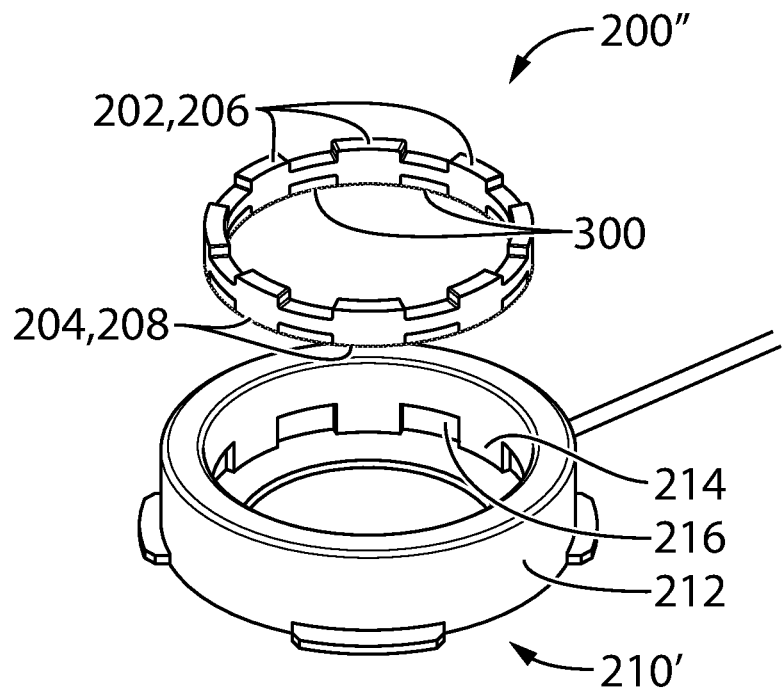
FIGS. 13A and 13B are exploded and non-exploded perspective views of yet another embodiment of an electromechanical apparatus.
Figure 13B:
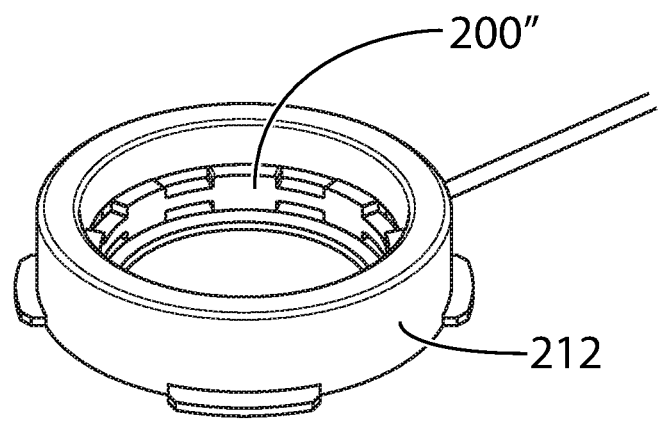

FIGS. 13A and 13B show another alternative embodiment of an armature 200" which has non-ferrite (e.g., plastic) molded inserts 300 fitted into the armature cutouts 209 on the speed sensing side 204. This construction enables the armature 200, 200' to have a smooth or contiguous form on the speed sensing side 204. It was found that the noncontiguous or open form of the armature had a tendency to displace lubricant that is typically present in the clutch assembly. The open form scooped and displaced lubricant in a manner that tended to propel the armature away from the base of the electromagnet housing 212 in axial and radial directions, resulting in noise, vibration and rattling issues. In addition, the open form armature had a reduced clamping force, which affected the contraction or expansion of the wrap spring clutch. The contiguous or closed form of the armature with non-ferrite inserts 300 reduces or eliminates these issues without affecting the ability to vary the magnetic reluctance of the rotating armature 200, 200'.

The inserts 300 can be installed through an over-molding process as known in the art. The non-ferrite inserts 300 can optionally be provided in the form of a toothed ring (not shown) that has a thin web interconnecting the non-ferrite teeth/inserts and the ring adhered or press-fit into place.

Although the illustrated embodiments have shown the armature and electromagnet housing teeth and cutouts to be rectangular shaped (along a circumferential line), it should be appreciated that the teeth and cutouts may have other geometric forms such as trapezoidal, triangular, or elliptical and still provide a measurable varying reluctance for sensing the speed of the rotating armature within the electromagnet. Similarly, it should be appreciated that the electromagnet housing does not necessarily have to have teeth. A similar effect can be achieved by changing the shape of the electromagnet housing and/or electromagnet coil. For example, the housing and coil may be formed in the shape of an ellipse to thereby yield two positions of maximum reluctance and two positions of minimum reluctance as the armature rotates. Likewise, the electromagnet housing and/or electromagnet coil can be formed in the shape of a square to yield four positions of maximum reluctance and four positions of minimum reluctance as the armature rotates.

In addition, although the speed sensing application discussed in detail above related to an armature which functions as an axially moving pole piece in a clutch assembly, the invention is not limited to this application. For example, the speed sensing technique can be applied to a non-axially moving magnetically permeable rotor that spins in situ in any electromechanical apparatus which has a drive (electrical or mechanical) for rotating the rotor relative to an electromagnet, so long as the rotor is in the magnetic path of and is influenced by the electromagnet. For example, the speed sensing technique discussed herein may be applied to a rotating machine such as a motor that has a rotating output shaft. The output shaft could have a rotor similar in shape to armature 200 mounted thereon, with the rotor spinning within the confines of an electromagnet similar to cylindrical electromagnet 210. In this application circuitry can apply an excitation level current to the electromagnet coil, sense the coil current, and process the resulting fluctuating speed sensing current to determine the speed of the motor based on the frequency of the fluctuations.

Diagnostic Methods for Determining Health of Water Pump

Figure 14:
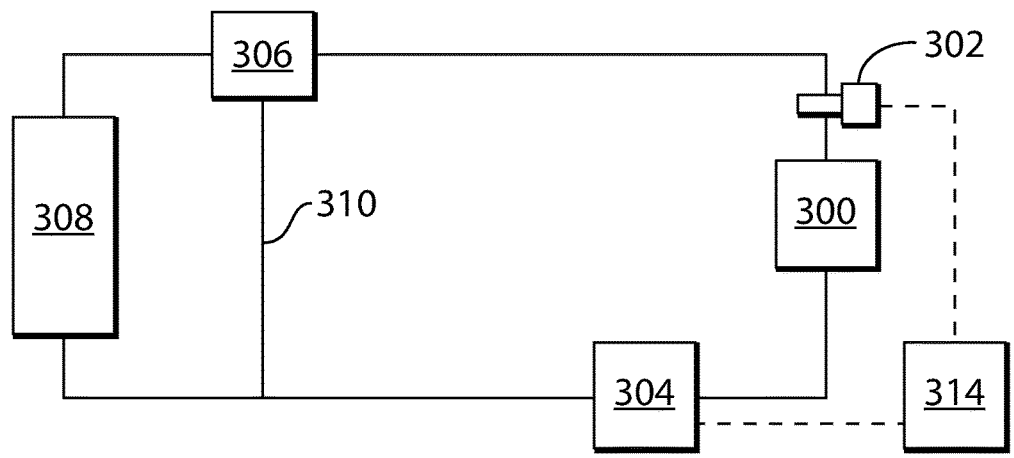
FIG. 14 is a schematic illustration of a coolant system in a vehicle.

In another aspect, a system and method for determining whether there is a problem with a water pump or other device is provided, with reference to FIG. 14. FIG. 14 is a schematic view of a typical engine coolant loop. As can be seen, the engine is shown at 300, a temperature sensor is shown at 302 which measures the temperature of coolant leaving the engine 300. The water pump is shown at 304 and may be any suitable type of water pump such as a clutched water pump that can be turned on and off as desired. Examples of such pumps are described in PCT publication WO2012000089A1, the contents of which are incorporated herein in their entirety. A thermostat is shown at 306 and a radiator is shown at 308. A radiator bypass line is shown at 310 and may be used to direct heated coolant to a heat exchanger to heat the vehicle's cabin. A control system 314 (FIG. 14) may be provided which controls the operation of the water pump 304 and which receives signals from the temperature sensor 302. The control system 314 may be a standalone unit that is separate from the Engine Control Unit, or it may be part of the vehicle's ECU, or it may be partially integrated into the ECU while also including a separate standalone unit for carrying out some functions.

In some engines the locations of the components relative to each other in the coolant loop may differ.

Figure 15:
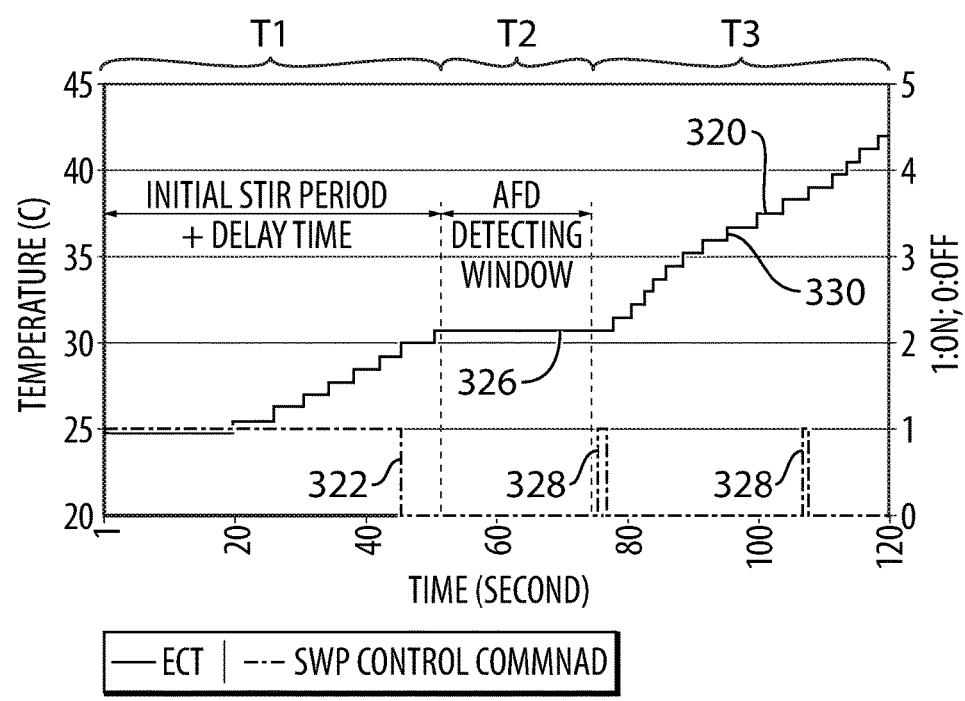
FIG. 15 is a graph illustrating the coolant temperature and duty cycle for a properly-functioning water pump from the coolant system shown in FIG. 14.

FIG. 15 represents the coolant temperature on the engine 300 where the water pump 304 is performing adequately, wherein the coolant temperature is measured via the temperature sensor 302. During a cold start, the water pump 304 may be operated in a fully-on mode for a short initial period so as to 'stir' the coolant, thereby helping to ensure that the temperature sensor obtains a more-accurate reading of the overall coolant temperature. The curve representing the coolant temperature is shown at 320. A curve representing the state of the water pump 304 is shown at 322. As can be seen during time period T1 the water pump 304 is on. During this time period, the temperature of the coolant begins to rise as the engine 300 warms up. At a selected point in time, (e.g. when the temperature sensed by the sensor 302 has risen by a selected amount, or has risen to a selected temperature), the control system 314 may shut off the water pump 304. At this point flow through the coolant loop stops and the dominant form of heat transfer from the engine 300 to the coolant is conduction. As a result, the temperature of the coolant in the immediate vicinity of temperature sensor 304 may remain substantially static briefly resulting in a 'flatline' region (shown at 326) in the curve 320, as shown in time period T2. While it is described as a flat-line region 326 it will be understood that this region 326 is not necessary strictly flat (i.e. having a strictly zero slope throughout) but is a region having a substantially zero average slope, or a slope that is substantially more flat (i.e. more towards zero) than the average slope of the curve 320 in the first time period T1.

The control system 314 may wait a first selected period of time (e.g. a few seconds) to let the coolant flow stop and for the coolant temperature at the sensor 302 to stabilize before determining that time period T2 has begun. The number of seconds to wait before starting time period T2 may be selected based on parameters such as the temperature sensor properties (e.g. its associated time constant), the distance between the sensor 302 and the engine 300 and other parameters such as engine load, ambient temperature, so that the temperature would have leveled off somewhat at least when the water pump 304 is operating properly. The control system 314 need only permit time period T2 to last for a selected amount of time such as 20 to 25 seconds. If time period T2 were permitted to last for a very long time, heat transfer from the engine through the coolant (and possibly passive convective flow of the coolant) could eventually cause a rise in the temperature seen by sensor 302 even though the water pump 304 was off during this time period.

After letting the temperature curve flatten out for the selected period of time that is time period T2, the control system 314 may then operate water pump 304 in another operating regime where the pump 304 is cycled on and off briefly in order to generate some coolant flow between the engine 300 and the temperature sensor 302 and through the coolant loop. The time period in which this operating regime takes place is shown as time period T3. This cycling is seen in the curve 322 as the brief 'on' periods shown at 328. As a result of the coolant flow generated by these 'on' periods 328, the temperature sensor 304 will again pick up an increase in coolant temperature as the heated coolant from the engine 300 is periodically circulated a bit.

While the curve 320 is shown as rising in a relatively smooth, progressive manner curve portion 330 in time period T3, the temperature increases seen by the sensor 302 may be somewhat stepped as slugs of coolant from within the engine 300 are transported to the sensor when the pump 304 is periodically turned on. However in embodiments where the temperature determined by the control system 314 is an average over a selected number of seconds, or in embodiments where the signal sent by the sensor 302 is an average over a selected number of seconds (i.e. based on its time constant), then the curve 320 may be seen to rise relatively smoothly in time period T3 as the averaging effect smooth out the temperature fluctuations from the periodic slugs of coolant that are moved past the sensor 302.

It will be noted that the presence of a detectable flat-line region 326 in the temperature curve 320 during time period T2, and the overall shape of the curve 320 as shown in FIG. 15 during time periods T1 and T2 particularly, depends on the temperature of the coolant being sufficiently low that the thermostat 306 does not open and direct coolant through the radiator 308 during these two time periods. If the thermostat opens during these time first two periods, it can be more difficult to use the present method to determine whether the water pump 304 is operating well. As a result, if the control system 314 detects that the temperature of the coolant as obtained from the signals from sensor 302 is too high (e.g. above 60 degrees C.) the method can be abandoned so as to not to risk determining false positives or false negatives in the health of the pump operation. The control system 314 could then wait to initiate the method during a subsequent event in which the engine 300 is cold-started, again monitoring the coolant temperature to determine whether the temperature is sufficiently low throughout time periods T1 and T2.

The presence of the detectable flat-line region 326 in the curve 320 during time period T2 indicates likely proper functioning of the water pump 304. If the pump 304 is stuck on or stuck off, the curve 320 will appear differently and will lack a detectable flat-line region 326.

Figure 16:
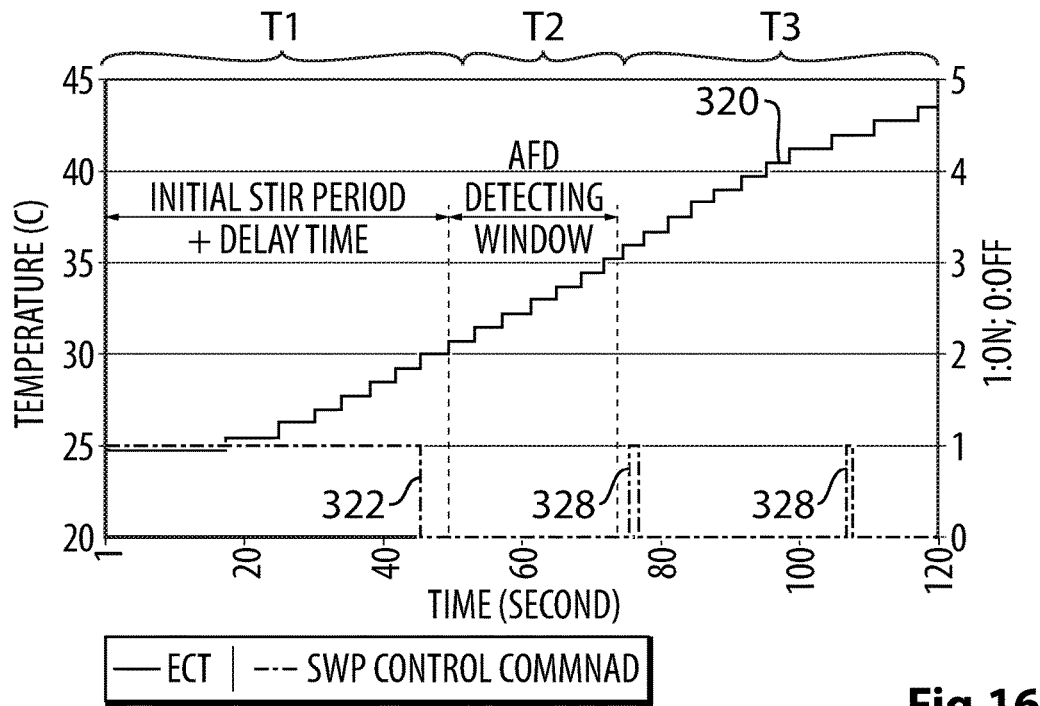

FIG. 16 shows a situation where the water pump 304 is stuck on (i.e. the water pump 304 does not shut off even when commanded to), so as to illustrate what the control system 314 may find if there is a problem with the water pump 304. As can be seen, during time period T1, the water pump 304 is on and the control system 314 does not check for a flat-line region at this time. Once the control system 314 determines that the coolant temperature has risen sufficiently, the control system 314 shuts off the water pump 304 and determines whether a flat-line region exists is time period T2. Because the water pump 304 is stuck on after the command was issued to shut it off, the temperature at the sensor 302 continues to climb because the water pump 304 continues to circulate coolant through the engine 300 and the coolant loop, and so coolant heated by the engine is continually transported past the thermocouple. Upon detecting no flat-line region in time period T2, the control system 314 can notify the appropriate program section of the vehicle's ECU and/or the vehicle driver, that there is a problem in the operation of the water pump 304.

Figure 17:
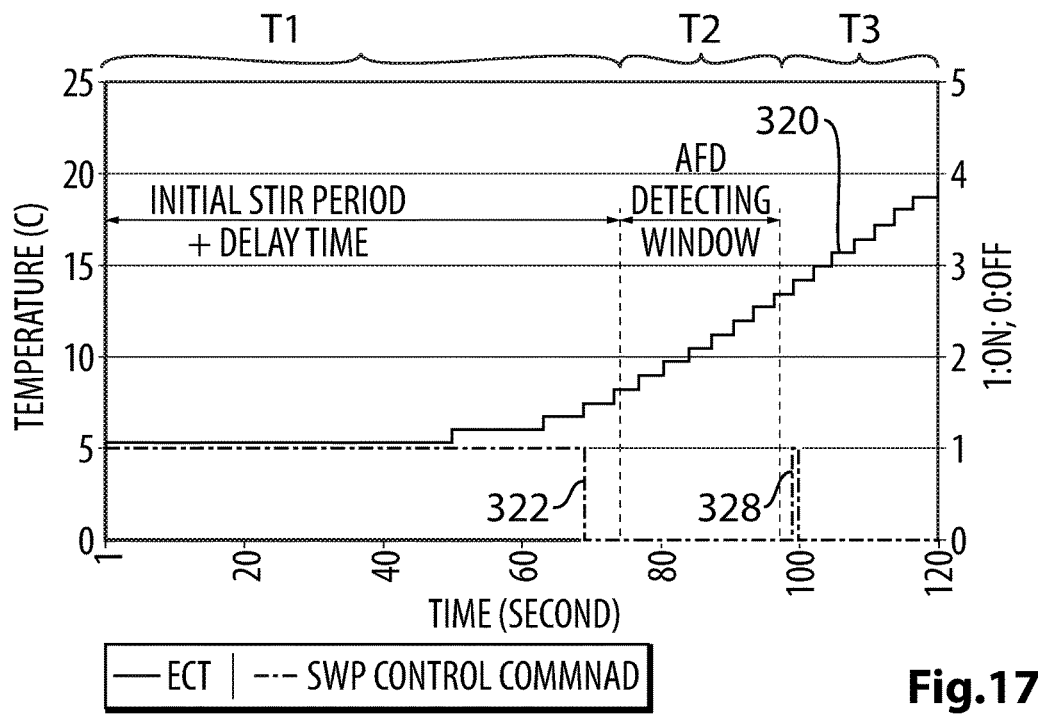
FIG. 17 is a graph illustrating the coolant temperature and duty cycle for a water pump that is stuck off.

FIG. 17 shows a situation where the water pump 304 is stuck off and therefore does not turn off even when commanded to. As can be seen, during time period T1, when the water pump 304 would normally be on, the temperature climbs very slowly due to the lack of circulation of coolant through the engine 300 and to the sensor 302 (because the water pump 30 is in fact off). Once the command to shut off the water pump 304 is issued the water pump 304 remains off and the temperature continues to climb as heat from the engine 300 migrates through the coolant to the sensor 302. Again, it can be seen that in time period T2 there is no flat-line region to the temperature curve 320. Upon detecting no flat-line region the control system 314 can notify the appropriate program section of the vehicle's ECU and/or the vehicle driver that there is a problem with the water pump or with the coolant system in general.

Figure 18:
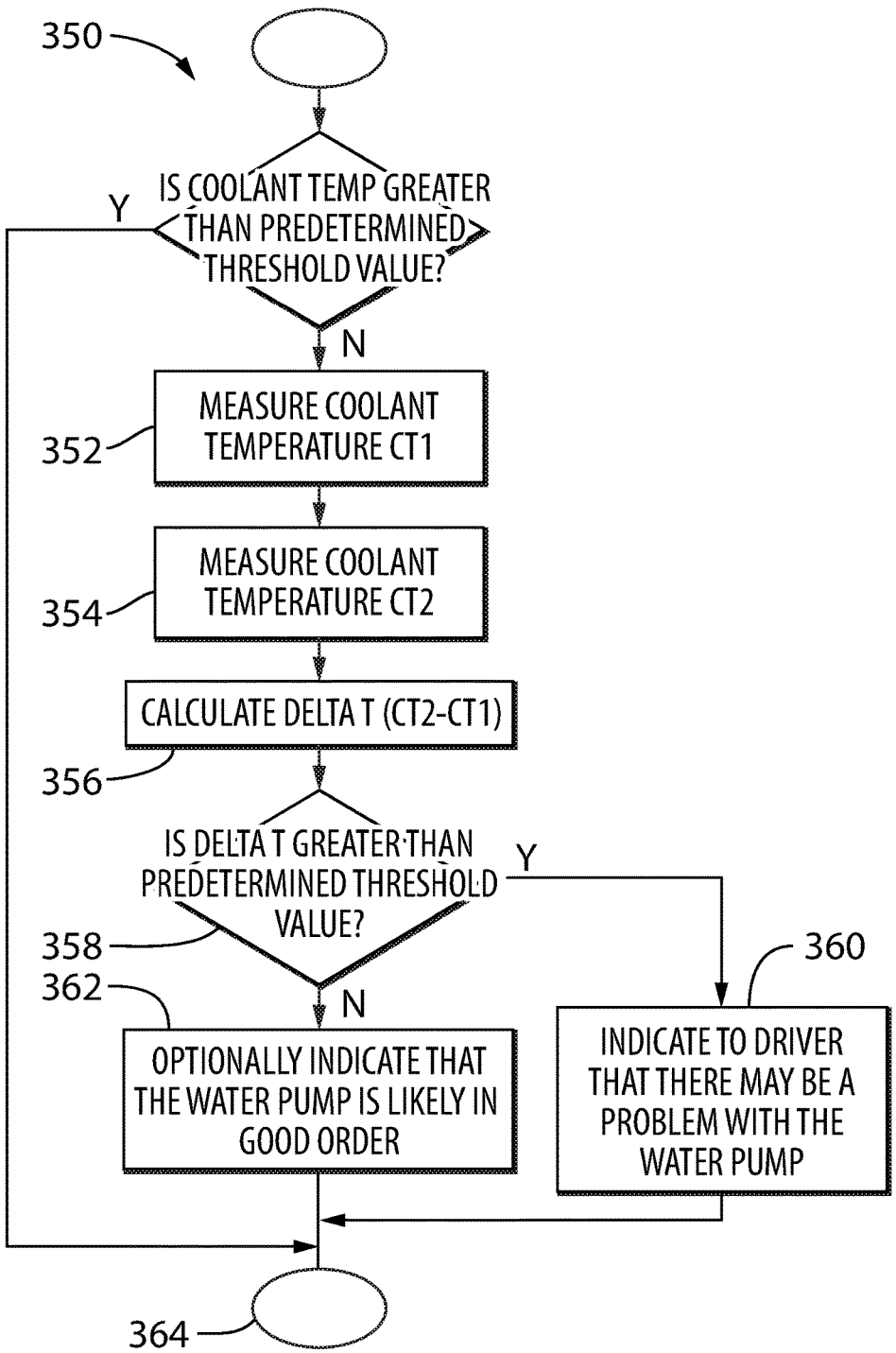
FIG. 18 is a flow diagram illustrating a method of determining whether the water pump shown in FIG. 14 is operating properly.

FIG. 18 illustrates an example of how the method may be carried out by the control system 314 (FIG. 14). The method is shown in FIG. 18 at 350. At step 351 during time period T1, the control system 314 determines whether the coolant temperature is too high which represents a risk that the thermostat 306 will open during time period T1 or T2. If the temperature is too high, then the method ends at step 364. If the temperature is not too high, then at step 352 the control system 314 determines a first temperature (called CT1) at a first point in time during the second time period T2 (e.g. immediately at the beginning of time period T2, which is a first selected period of time after the command was issued to stop the water pump 304). At step 354 the control system determines a second temperature (called CT2) a second point in time which is after a second selected period of time has passed since the command was issued to stop the pump 304. This second point in time denotes the end of time period T2. At step 356 the control system 314 takes a difference between CT2 and CT1 and at step 358 it determines whether the difference is larger than a predetermined threshold flat-line value so as to determine whether or not a flat-line region exists. If the difference is larger than the predetermined threshold flat-line value then the control system 314 may output an indication that a problem may exist with the water pump 304 at step 360. If the difference is not larger than the predetermined threshold flat-line value, then the control system 314 may do nothing or may output an indication that the water pump 304 appears to be operating well at step 362.

Testing of a sample engine during vehicle design and development may be used to determine parameters such as the temperature threshold values below which the coolant temperature much be in order to permit the control system 314 to check for a flat-line region, the parameter or parameters that signal the end of time period T1 and the start of time period T2, the length of time period T2, and other parameters.

An advantage to using the method described in FIGS. 15-18 is that it can be carried out using sensing components that already form part of most new vehicles today. For example, the temperature sensor 302 is typically provided on new vehicles so as to monitor the temperature of the coolant. Thus, the method 350 may be implemented relatively easily and inexpensively without the need for specialized sensors such as sensors to measure the speed of the water pump 304, sensors installed in the engine block to measure the metal temperature, and the like.

Figure 19:
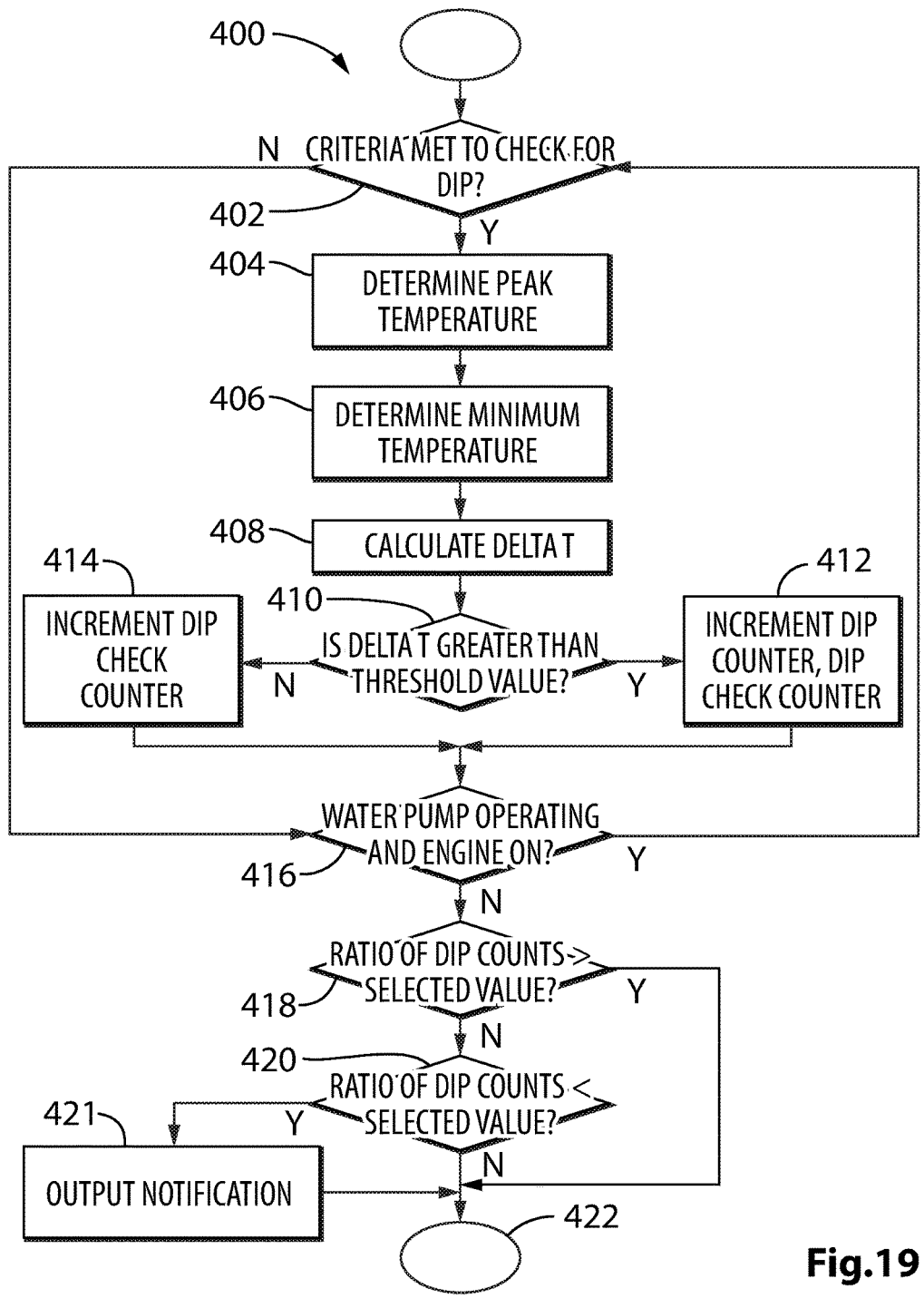
FIG. 19 is a flow diagram illustrating another method of determining whether the water pump shown in FIG. 14 is operating properly.
Figure 20:
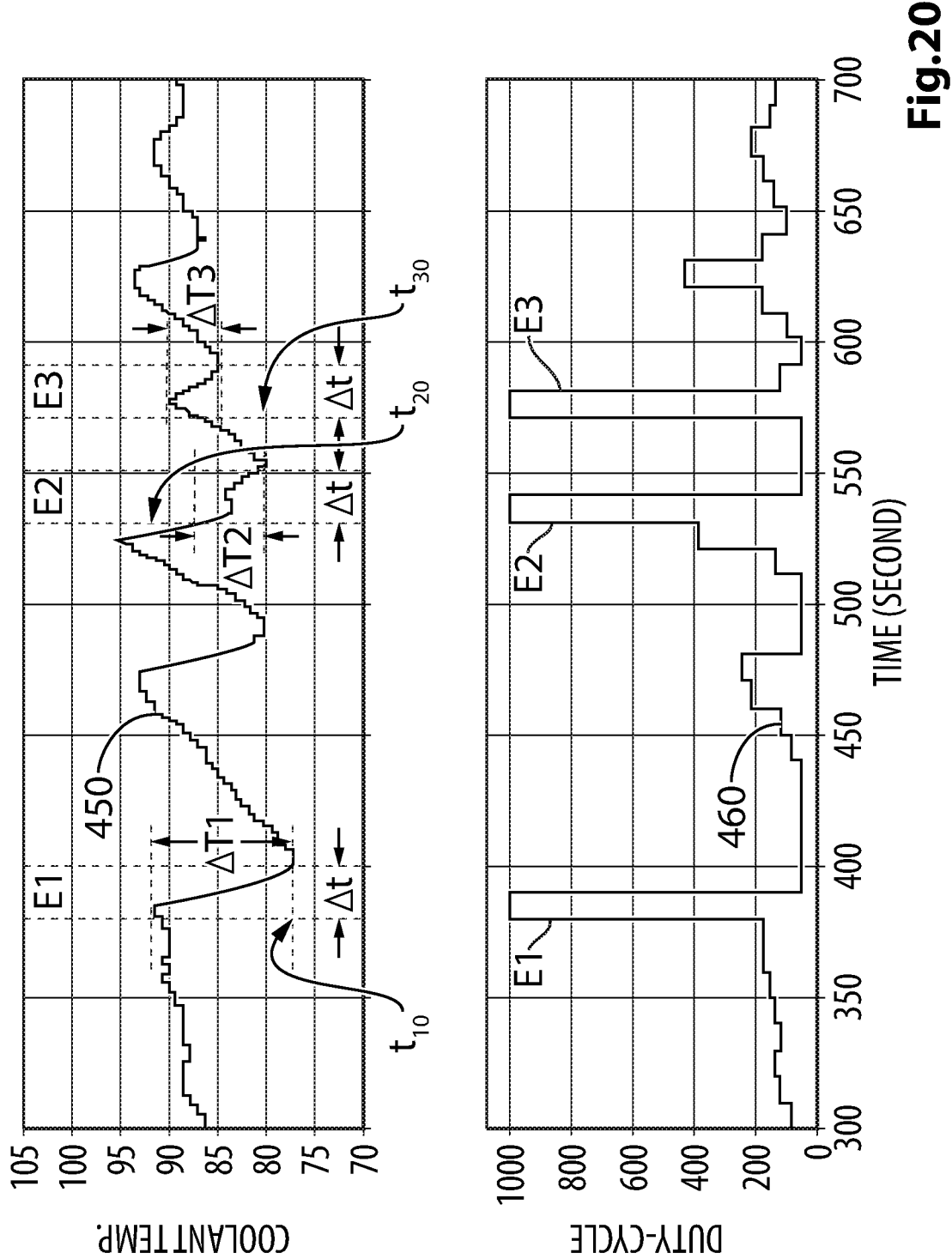
FIG. 20 is a graph illustrating the use of the method shown in FIG. 19.

Another method for determining whether the water pump 304 is operating properly is shown at 400 in FIG. 19 with reference to the graph in FIG. 20. The method in general checks to see if a dip in the coolant temperature follows a sufficiently high change in the commanded duty cycle of the pump 304, and is therefore applicable in embodiments wherein the pump 304 is clutched and can be turned on and off. Such pumps may be operated by continuously clutching and declutching them according to a selected duty cycle. This permits the flow rate of the pump 304 to be selectable throughout a range. If a relatively high increase in the duty cycle of the pump 304 is commanded, it is expected that, if the pump 304 is operating properly, there should be a commensurate dip in the coolant temperature shortly thereafter. If the pump 304 is not operating properly (e.g. if the pump 304 is stuck on, or is stuck off), then the control system 314 will not see the expected dip in the coolant temperature.

The method 400 begins by verifying at step 402 whether the criteria are met to see whether it is appropriate to check for a dip in the coolant temperature. These criteria may include:
1. check if the ambient temperature is sufficiently high;
2. check if the engine is sufficiently warm;
3. check if the water pump has been operating at a duty cycle that is below a selected threshold low duty cycle value, for at least a selected low duty cycle threshold period of time; and
4. check if the control system 314 (FIG. 14) has commanded a change in the duty cycle of the water pump that is greater than a selected threshold duty cycle change value.

If the answers to all of the above questions are all 'yes' then the method proceeds to check for a sufficiently large dip in the coolant temperature. In criterion 4, the control system 314 may check if the change in the duty cycle of the pump 304 is greater than 50%, however, any other suitable value that is determined to work well may be used. In criterion 3, the control system 314 may, for example, check if the pump 304 has been operating at less than 25% for at least 20 seconds, however any other suitable maximum duty cycle and minimum time period may be used. In general the threshold values used for the criteria above may be determined by testing the engine during design and development of the vehicle.

To check for a dip in the coolant temperature, steps 404, 406 and 408 are carried out. In step 404 the control system 314 searches for a peak temperature (TP) in the coolant temperature over a selected first time period T1 after the increase in the duty cycle occurs. The selected time period may be, for example, 5 seconds. In step 406 the control system 314 searches for a minimum coolant temperature (TM) over a selected second time period T2 that is immediately after the first time period T1. The second time period T2 may be, for example, 20 seconds. At step 408, the control system 314 determines a difference ($\Delta T$) between the peak temperature TP and the minimum temperature TM. At step 410 the control system 314 determines whether the difference $\Delta T$ is larger than a selected threshold value. If so, then the control system 314 determines that a dip in the temperature has been found and the control system records the event by incrementing a dip counter at step 412. Also a total dip check counter is incremented for every time a dip check is carried out and so would be incremented in step 412. If the difference $\Delta T$ determined at step 410 is not larger than the relevant threshold value then the control system 314 notes at step 414 that a dip was not found even though one was expected based on the aforementioned criteria having been met, e.g. by incrementing the total dip check counter but not incrementing the dip counter.

After either of steps 412 and 414 the control system 314 sends program control to step 416. At step 416, the control system 314 may check if the water pump 304 is still being driven in a partial flow mode (i.e. if it is being clutched and declutched in order to achieve some selected flow rate that is less than its maximum flow rate) and checks if the engine is still on. If so, then control returns to step 402 wherein the criteria described above are checked. If the engine is off or the pump 304 is no longer being used, the control system 314 may determine that the drive cycle is now completed, and it checks at step 418 to see if the ratio of dip counts (i.e. the number of times a dip check resulted in a positive determination that a dip occurred), to the total number of dip checks (i.e. the value recorded by the total dip check counter) is greater than a selected value such as 50%. If the ratio is greater than 50%, then the control system 314 determines that the pump 304 is operating properly. If the ratio is not greater than the selected value, then step 420 is carried out where the control system 314 checks whether the ratio is less than the selected value, in which case, the dip check determines that there may be problem with the pump 304 and may at step 421 output an indication of the possible problem (e.g. to a suitable element in the ECU, and/or to the vehicle driver). If the ratio is neither greater nor less than the selected value, then the control system 314 may determine that the results were indeterminate. The method ends at 422.

The curves shown at 450 and 460 in FIG. 20 illustrate the execution of the method 400. The curves 450 and 460 are representative of the temperature and water pump duty cycle respectively in an example drive cycle for a vehicle. As can be seen, a first event (shown at E1) occurs at about 380 seconds into the drive cycle, and the peak and subsequent minimum temperatures are recorded and the difference between them (shown as $\Delta T1$) recorded over the subsequent first and second time periods (together shown as $\Delta t$). As can be seen, a second event is shown at E2 with a resulting temperature difference $\Delta T2$ and a third event at E3 with a resulting temperature difference $\Delta T3$.

In general, when the duty cycle of the pump 304 is increased significantly (i.e. by at least the selected amount) the coolant temperature is expected to drop from whatever its current temperature is to approximately the opening temperature of the thermostat. If the thermostat is what is referred to as a 'smart' thermostat, the opening temperature may change depending on certain parameters, thereby making it more difficult for the control system 314 to determine if a suitably sized temperature difference occurred. Thus, it is preferred for the method 400 to be carried out with a standard thermostat that has a constant opening temperature. It is contemplated that the control system 314 could be programmed to compensate for a changing opening temperature however, when determining whether the temperature difference is sufficiently large to count as a dip count.

Thus, two different methods (i.e. methods 350 and 400) may be used to determine the health of the water pump 304. Furthermore, by providing two methods that are usable under different conditions of a drive cycle, it is more likely that at least one of these methods will be usable during any given drive cycle so as to identify a faulty pump 304 as quickly as possible. Put another way, it is advantageous to provide a cooling system for a vehicle that includes a water pump configured to circulate coolant through an engine, wherein the water pump is selectably clutched so as to permit the water pump to be turned on and off, a temperature sensor positioned to sense the temperature of the coolant, and a control system, wherein the control system (e.g. control system 314) is programmed with two schemes for detecting the health of the water pump 304, the first scheme (e.g. method 350) is carried out by the control system if a first set of criteria are met during operation of the vehicle (e.g. whether the coolant temperature is too high during time period T1, whether the temperature sensed by the sensor 302 has risen by a selected amount during time period T1). The second scheme is carried out by the control system if a second set of criteria are met during operation of the vehicle (e.g. the four criteria listed above, which are checked in step 402). As can be seen the second set of criteria are different than the first set of criteria.

The first scheme may be summarized as follows:

a) operating the water pump upon startup of the engine;

b) commanding the water pump to stop;

c) determining a first coolant temperature (CT1) a first selected period of time after step b);

d) determining a second coolant temperature a second selected period of time after step b);

e) determining whether a difference between the first and second coolant temperatures is greater than a predetermined threshold flat-line value; and f) outputting a notification if the difference in step e) is greater than the selected flat-line threshold value.

The second scheme may be summarized as follows:

g) operating the water pump for at least a selected low duty cycle threshold period of time at a duty cycle that is below a selected threshold low duty cycle value;

h) commanding an increase in the duty cycle of the water pump that is greater than a selected threshold duty cycle change value;

i) determining a peak coolant temperature during a first selected period of time after step h);

j) determining a minimum coolant temperature a during second selected period of time after the first selected period of time;

k) determining whether a difference between the peak and minimum coolant temperatures is greater than a predetermined threshold temperature change value;

l) determining the health of the water pump based at least in part on the result of step k) (e.g. during steps 418 and 420 in FIG. 19);

m) outputting a notification based on the result of step l).

Those skilled in the art will understand that a variety of modifications may be effected to the embodiments described herein without departing from the scope of the appended claims.

The invention claimed is:

1. An electromechanical apparatus, comprising:
an electromagnet including a magnetically permeable housing and a wire coil disposed therein;
a magnetically permeable rotor that spins about an axis within the apparatus, the rotor being disposed in the path of a magnetic circuit generated by the electromagnet when energized;
a drive for rotating the rotor relative to the electromagnet housing;
wherein the rotor and the electromagnet housing are each shaped to vary the reluctance between the rotor and the electromagnet housing as the rotor rotates,
a current source configured to apply a current to the electromagnet coil, wherein, during rotation of the rotor, fluctuations in the current result in the electromagnet coil due to varying reluctance between the rotor and the electromagnet housing are superimposed on the applied current;
a current sensor connected to, and sensing the fluctuations in the current in, the electromagnet coil; and
processing logic, connected to the current sensor and configured for reading the sensed current and determining the frequency of the fluctuations, said frequency being correlated to the rotor speed,
wherein the rotor functions as an armature by being axially moveable.

2. An apparatus according to claim 1, wherein the current source is configured to adjust the current to the electromagnet coil, which adjusts the speed of the rotor.

3. An apparatus according to claim 1, wherein:
the electromagnet housing has a circumferential wall disposed about the axis, the housing wall having a circumferential edge including a plurality of axially extending teeth and corresponding cutouts;
the rotor has a circumferential wall disposed about the axis, the rotor wall having a circumferential edge including a plurality of axially extending teeth and corresponding cutouts; and
the rotor teeth and cutouts are juxtaposed against the housing teeth and cutouts.

4. An apparatus according to claim 1, wherein:
the rotor teeth and cutouts are rectangularly shaped along the circumferential edge of the rotor wall; and
the housing teeth and cutouts are rectangularly shaped along the circumferential edge of the housing wall.

5. An apparatus according to claim 1, wherein the processing logic includes:
means for filtering d.c. from the sensed current;
a zero-crossing detector receiving the filtered sensed current and generating a digital speed signal; and
a computational block for determining the frequency or period of the digital speed signal.

6. An apparatus according to claim 1, wherein the processing logic includes:
a peak detector connected to receive the sensed current as an input and generate a digital speed signal an output; and
a computational block for determining the frequency or period of the digital speed signal.

7. An apparatus according to claim 6, including means for filtering d.c. from the sensed current prior to peak detection.

8. An apparatus according to claim 7, including a comparator for detecting if the amplitude of the sensed current exceeds a threshold level.

9. An apparatus according to claim 1, wherein the apparatus is a clutch assembly which includes:
   an input clutch member;
   an output clutch member having an inner diameter;
   a wrap spring clutch (WSC) having a first end, a second end, and a plurality of coils therebetween, wherein the first end of the WSC is connected to the input clutch member, the second end of the WSC is connected to the armature; and the WSC coils are selectively engageable with the inner diameter of the output clutch member to transfer torque to the output clutch member from the input clutch member via the WSC coils through actuation or non-actuation of the armature against a relatively large inertial mass.

10. An apparatus according to claim 9, wherein the WSC coils have a nominal diameter less than an inner diameter of the output clutch so that the clutch assembly is normally disengaged and actuating the armature against the relatively large inertial mass expands the WSC coils to enable torque transfer to the output clutch member.

11. An apparatus according to claim 9, wherein the WSC coils have a nominal diameter greater than an inner diameter of the output clutch so that the clutch assembly is normally engaged and torque transfer to the output clutch member is inhibited by contracting the WSC coils as a result of actuating the armature against the relatively large inertial mass.

* * * * *